United States Patent
Choi

(10) Patent No.: US 10,579,057 B2
(45) Date of Patent: Mar. 3, 2020

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventor: Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 15/875,701

(22) Filed: Jan. 19, 2018

(65) Prior Publication Data

US 2019/0086916 A1 Mar. 21, 2019

(30) Foreign Application Priority Data

Sep. 15, 2017 (KR) .................. 10-2017-0118912

(51) Int. Cl.
| | |
|---|---|
| *B60W 50/00* | (2006.01) |
| *B60W 50/10* | (2012.01) |
| *G05D 1/00* | (2006.01) |
| *G08G 1/09* | (2006.01) |
| *G05D 1/02* | (2020.01) |
| *B60W 50/08* | (2020.01) |

(52) U.S. Cl.
CPC ......... *G05D 1/0061* (2013.01); *B60W 50/087* (2013.01); *B60W 50/10* (2013.01); *G05D 1/0088* (2013.01); *G05D 1/0274* (2013.01); *G05D 1/0276* (2013.01); *G08G 1/09* (2013.01); *B60W 2050/0088* (2013.01); *B60W 2050/0089* (2013.01); *B60W 2550/22* (2013.01)

(58) Field of Classification Search
CPC .... B60W 50/00; B60W 50/10; B60W 50/087; G05D 1/00; G05D 1/0088; G05D 1/0274; G05D 1/0276; G08G 1/16
See application file for complete search history.

(56) References Cited

U.S. PATENT DOCUMENTS

| | | | |
|---|---|---|---|
| 2011/0246210 A1* | 10/2011 | Matsur ................. | G06Q 10/06 705/1.1 |
| 2015/0149017 A1* | 5/2015 | Attard ................. | B60W 30/182 701/23 |
| 2015/0158486 A1 | 6/2015 | Healey et al. | |
| 2015/0309512 A1 | 10/2015 | Cudak et al. | |
| 2016/0047660 A1 | 2/2016 | Fausten | |
| 2017/0066452 A1* | 3/2017 | Scofield ................. | B60W 50/14 |
| 2017/0276492 A1* | 9/2017 | Ramasamy ............ | G01C 21/34 |

(Continued)

FOREIGN PATENT DOCUMENTS

| | | |
|---|---|---|
| JP | 2006-322752 A | 11/2006 |
| JP | 2014-219721 A | 11/2014 |

(Continued)

*Primary Examiner* — Yonel Beaulieu
(74) *Attorney, Agent, or Firm* — Birch, Stewart, Kolasch & Birch, LLP

(57) ABSTRACT

A vehicle control device can include a memory; and a processor to generate driving information including information of driving the vehicle in a manual driving mode from a first point to a second point in a preset manner based on traffic regulations stored in the memory, store the driving information in the memory, and drive the vehicle in an autonomous driving mode based on the driving information stored in the memory.

19 Claims, 16 Drawing Sheets

(56) References Cited

U.S. PATENT DOCUMENTS

| | | | | |
|---|---|---|---|---|
| 2018/0118219 A1* | 5/2018 | Hiei | ................... | B60W 40/09 |
| 2018/0201263 A1* | 7/2018 | Slusar | ................ | B60W 30/143 |
| 2018/0281795 A1* | 10/2018 | Ravichandran | ....... | B60W 50/10 |
| 2019/0041850 A1* | 2/2019 | Chase | ................ | B60W 50/029 |
| 2019/0051172 A1* | 2/2019 | Stenneth | ............. | G08G 1/0112 |

FOREIGN PATENT DOCUMENTS

| | | |
|---|---|---|
| KR | 10-2009-0124535 A | 12/2009 |
| KR | 10-2017-0087647 A | 7/2017 |

\* cited by examiner (a)

(b)

(a)

(b)

(a)

⇩ UNABLE TO MODIFY VIOLATION (b)

(a)

⇩ UNABLE TO MODIFY VIOLATION (b)

(a)

(b)

(a)

⬇ UNABLE TO MODIFY VIOLATION (b)

(a) [CHECK VIOLATION OF REGULATIONS FOR PRECEDING VEHICLE]

(b) [LEANING ROUTE-BASED DRIVING]

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0118912, filed in the Republic of Korea on Sep. 15, 2017, the contents of which are incorporated by reference herein in its entirety.

BACKGROUND OF THE INVENTION

1. Field of the Invention

This present disclosure relates to a vehicle control device provided in a vehicle and a control method of the vehicle.

2. Background of the Invention

A vehicle is a device capable of being moved in a desired direction by a user who is on board. Typically, an automobile will be taken as an example.

In addition, for convenience of a user using a vehicle, various types of sensors and electronic devices are provided in the vehicle. In particular, for the convenience of the user's driving, research on an advanced driver assistance system (ADAS) is being actively carried out. Furthermore, development of an autonomous vehicle is being actively carried out.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when applying the brakes, turn indicator lamps used upon making a left turn or a right turn.

For another example, reflectors for reflecting light to facilitate the vehicle to be recognized from outside are mounted on front and rear sides of the vehicle.

Installation criteria and standards of the lamps for the vehicle are regulated as rules to fully exhibit each function.

In addition, as the development of the advanced driving assist system (ADAS) is actively undergoing in recent time, development of a technology for optimizing user's convenience and safety while driving a vehicle is required.

Moreover, in recent years, the development of various technologies for allowing a vehicle to perform autonomous driving has been actively carried out.

SUMMARY OF THE INVENTION

An object of the present disclosure is to provide a vehicle control device capable of allowing a vehicle to perform autonomous driving in an optimized manner, and a control method of the vehicle.

Another object of the present disclosure is to provide a vehicle control device capable of allowing a vehicle to perform autonomous driving based on information related to driving learned through manual driving, and a control method of the vehicle.

Still another object of the present disclosure is to provide a vehicle control device capable of controlling a vehicle in an optimized manner when driving information generated through learning based on manual driving is violated by traffic regulations, and a control method of the vehicle.

The tasks of the present disclosure may not be limited to the above-mentioned problems, and other tasks not mentioned herein may be clearly understood by those skilled in the art from the following description.

In order to accomplish the foregoing tasks, a vehicle control device according to an embodiment of the present disclosure may include a memory, and a processor configured to store driving information in which a vehicle has driven in a manual driving mode in the memory, and allow the vehicle to drive in an autonomous driving mode based on the stored driving information, in which the processor stores the driving information in which the vehicle has driven in a manual driving mode in a preset manner based on information related to traffic regulations.

According to an embodiment, the processor may generate driving information in which the vehicle has driven in a manual driving mode from a first point to a second point different from the first point, and determine a section in which the vehicle violates traffic regulations between the first point and the second point based on the information related to traffic regulations.

According to an embodiment, the processor may process the generated driving information in a different manner based on a section in which the vehicle violates traffic regulations.

According to an embodiment, the processor may not store the generated driving information in the memory when the vehicle violates traffic regulations in entire sections between the first point and the second point, and output information for notifying to regenerate driving information between the first point and the second point through new manual driving through the output unit.

According to an embodiment, when the vehicle violates traffic regulations in a partial section between the first point and the second point, the processor may not store driving information generated from the partial section, and store driving information generated from a section that complies with traffic regulations in the memory among driving information that has been driven in a manual driving mode from the first point to the second point.

According to an embodiment, when the vehicle violates traffic regulations in a partial section between the first point and the second point, the processor may modify driving information generated from the partial section in a preset manner to store the modified driving information in the memory.

According to an embodiment, modifying driving information generated from the partial section in a preset manner may modify driving information in the partial section based on information received from another vehicle that has been driven in the partial section before a predetermined time period or a driving history in which the vehicle has driven in the partial section in the past.

According to an embodiment, even when the vehicle violates traffic regulations in a partial section between the first point and the second point, the processor may store driving information that has been driven in a manual driving mode from the first point to the second point as it is in the memory.

According to an embodiment, the processor may process the driving information in different manners based on the state of the partial section.

According to an embodiment, when the vehicle drives in accordance with traffic regulations in entire sections between the first point and the second point, the processor may store the generated driving information in the memory.

According to an embodiment, driving information stored in the memory may be information in which the vehicle has driven from a first point to a second point different from the first point or information that has been driven in a manual driving mode by another vehicle from the first point to the second point, and the processor may detect whether or not there exists a section in which the driving information violates traffic regulations between the first point and the second point, based on information related to traffic regulations stored in the memory and the driving information before allowing the vehicle to perform autonomous driving.

According to an embodiment, the processor may allow the vehicle to perform autonomous driving from the first point to the second point using driving information stored in the memory when there does not exist a section in which the driving information violates traffic regulations.

According to an embodiment, when a section in which the driving information violates the traffic regulations is entire sections between the first point and the second point, the processor may allow the vehicle to drive in a manual driving mode.

According to an embodiment, when a section in which driving information violates traffic regulations is a partial section between the first point and the second point, the processor may control the vehicle in different ways based on whether or not it is possible to modify driving information for the partial section.

According to an embodiment, when it is impossible to modify driving information for the partial section, the processor may allow the vehicle to drive in a manual driving mode in the partial section among sections between the first point and the second point, and allow the vehicle to drive in an autonomous driving mode in the remaining sections.

According to an embodiment, the processor may modify driving information for the partial section among driving information stored in the memory when it is possible to modify driving information for the partial section, and allow the vehicle to drive in an autonomous driving mode from the first point to the second point based on the modified driving information.

According to an embodiment, when the driving information is stored in a state where traffic regulations are observed in entire sections that have been driven in a manual driving mode at the time of being stored in the memory but the traffic regulations are changed or the state of a road is changed in a partial section, the processor may allow the vehicle to drive in a manual driving mode in the partial section or modify driving information for the partial section.

According to an embodiment, when the vehicle is driven in a manual driving mode in the partial section, the processor may reflect driving information that has been driven in a manual driving mode in the partial section on the driving information stored in the memory.

A vehicle according to an embodiment of the present disclosure may include the vehicle control device disclosed in the present specification.

A method of controlling a vehicle according to an embodiment of the present disclosure may include storing driving information in which a vehicle has driven in a manual driving mode in a memory, and allowing the vehicle to drive in an autonomous mode based on the stored driving information, in which the storing step stores driving information in which the vehicle has driven in a manual driving mode in a preset manner based on information related to traffic regulations.

Other details of embodiments are included in the detailed description and the drawings.

According to an embodiment of the present disclosure, there is one or more of the following effects.

First, the present disclosure may provide a new autonomous driving method capable of allowing a vehicle to perform autonomous driving based on information related to driving learned through manual driving.

Second, the present disclosure may provide a vehicle control device and a control method of the vehicle capable of allowing a vehicle to perform autonomous driving through at least one of a learning autonomous driving mode learned through manual driving and a sensor autonomous driving mode using a sensing unit.

Third, the present disclosure may provide a new control method of a vehicle allowing the vehicle to perform autonomous driving in a learning autonomous driving mode for a section in which the vehicle is unable to drive in a sensor autonomous travel mode.

Fourth, the present disclosure may provide a vehicle control device capable of processing driving information in an optimized manner when the vehicle is manually driven in violation of traffic regulations when learning driving information through manual driving.

Fifth, the present disclosure provides a control method capable of modifying driving information to comply with traffic regulations when the driving information violates the traffic regulations or when road situation or the traffic regulations are changed to violate the driving information, thereby allowing a vehicle to more safely perform autonomous driving.

The effects of the present disclosure may not be limited to the above-mentioned effects, and other effects not mentioned herein may be clearly understood by those skilled in the art from the description of the claims.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
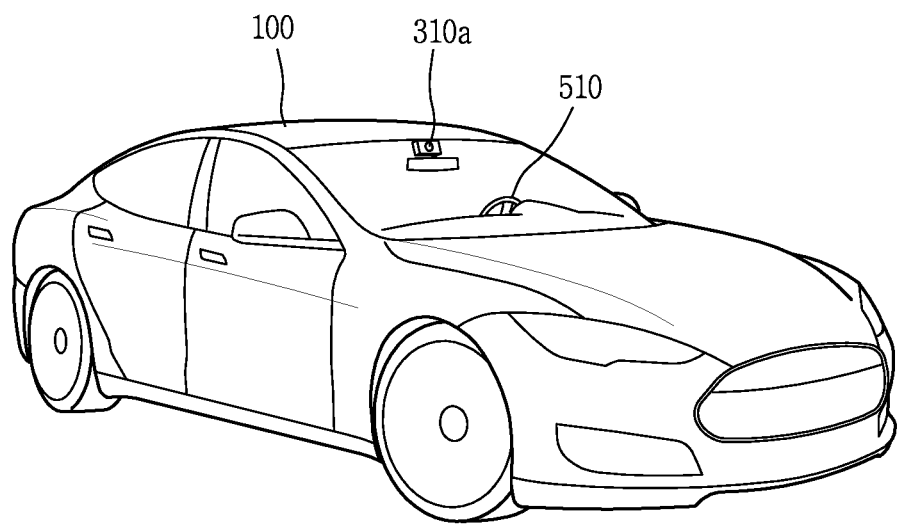
FIG. 1 is a view illustrating an appearance of a vehicle according to an embodiment of the present disclosure.
Figure 1:
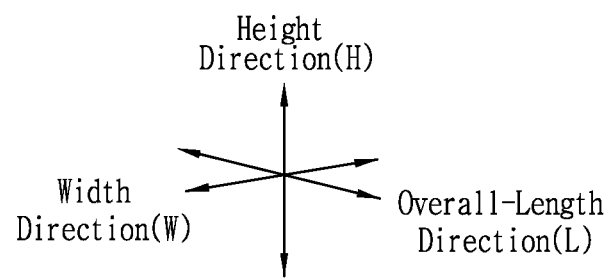

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

It will be understood that, although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating an appearance of a vehicle according to an embodiment of the present disclosure.

Figure 2:
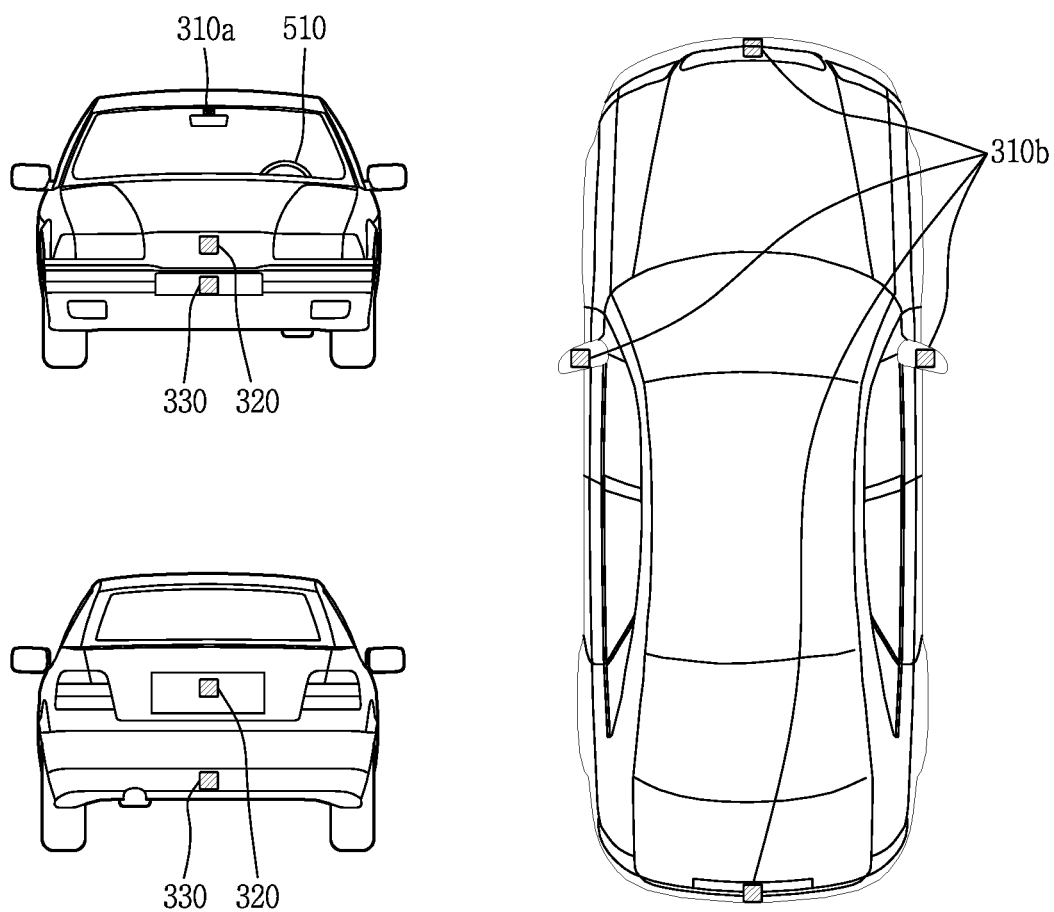
FIG. 2 is a view in which a vehicle according to an embodiment of the present disclosure is viewed at various angles from the outside.

FIG. 2 is a view in which a vehicle according to an embodiment of the present disclosure is viewed at various angles from the outside.

Figure 3:
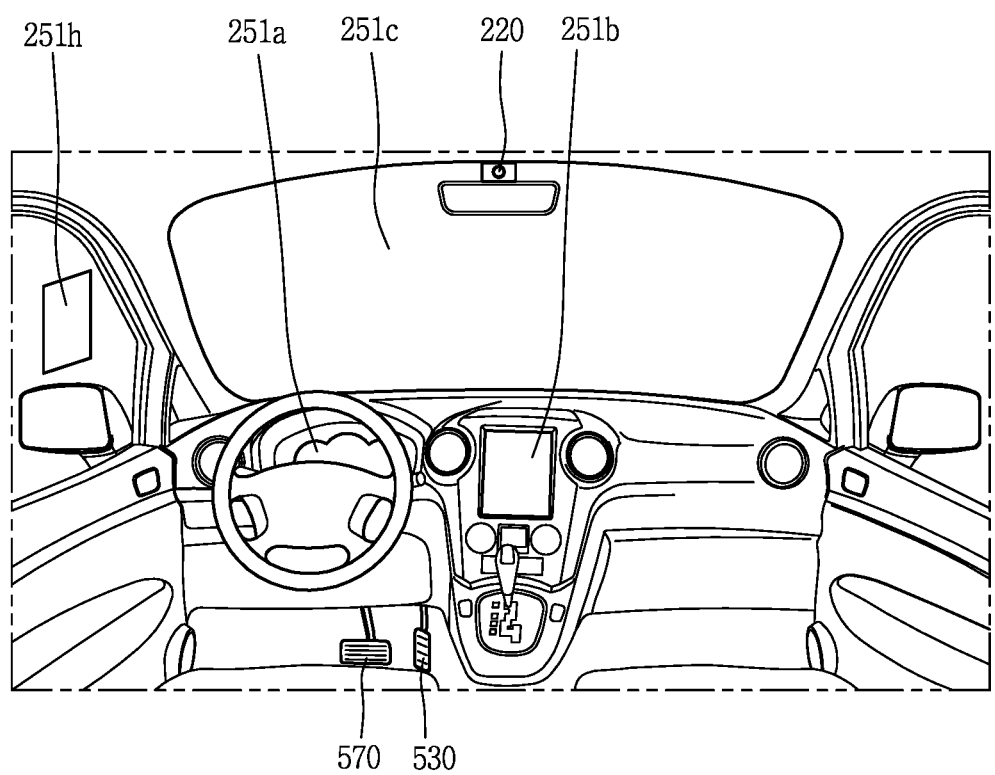
FIGS. 3 and 4 are views illustrating an inside of a vehicle according to an embodiment of the present disclosure.
Figure 4:
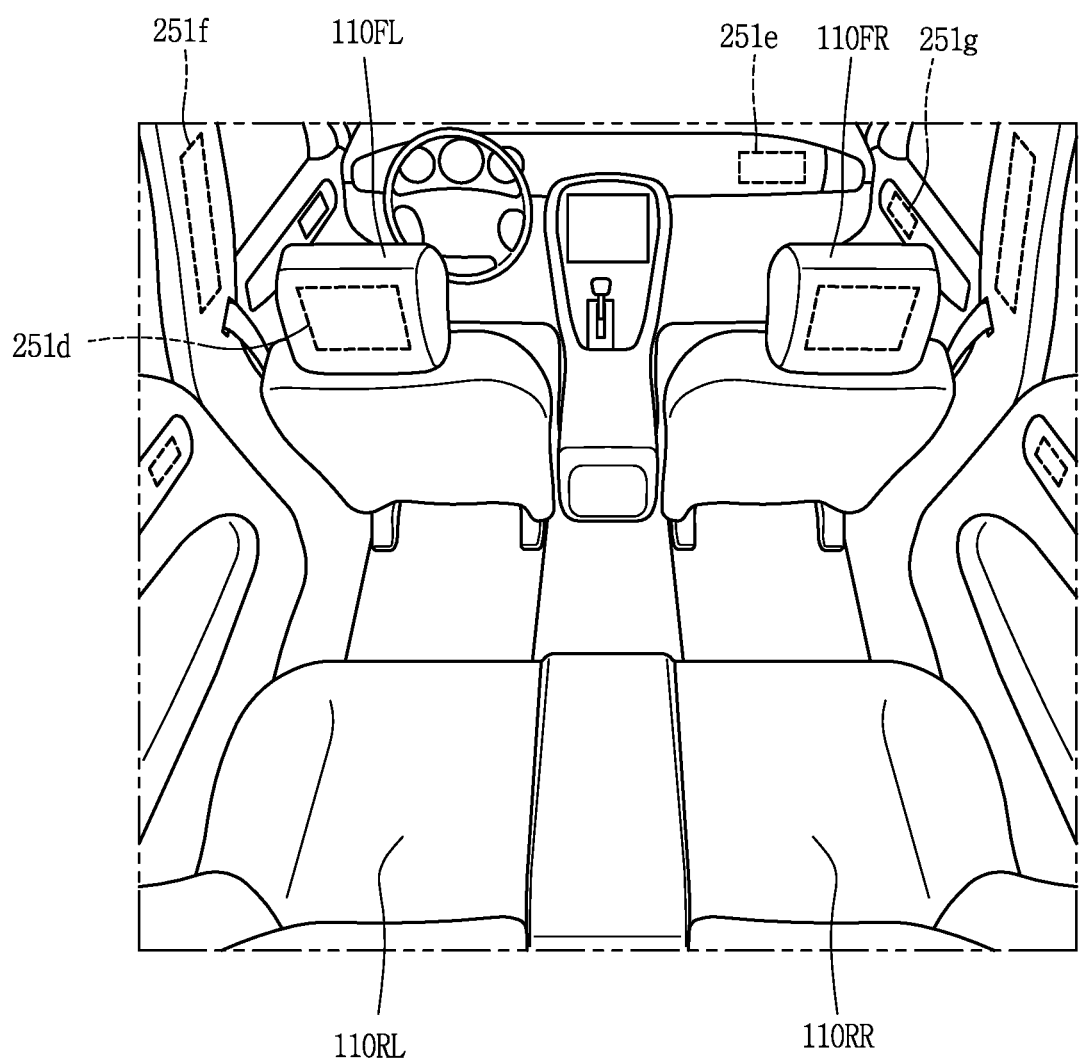

FIGS. 3 and 4 are views illustrating an inside of a vehicle according to an embodiment of the present disclosure.

Figure 5:
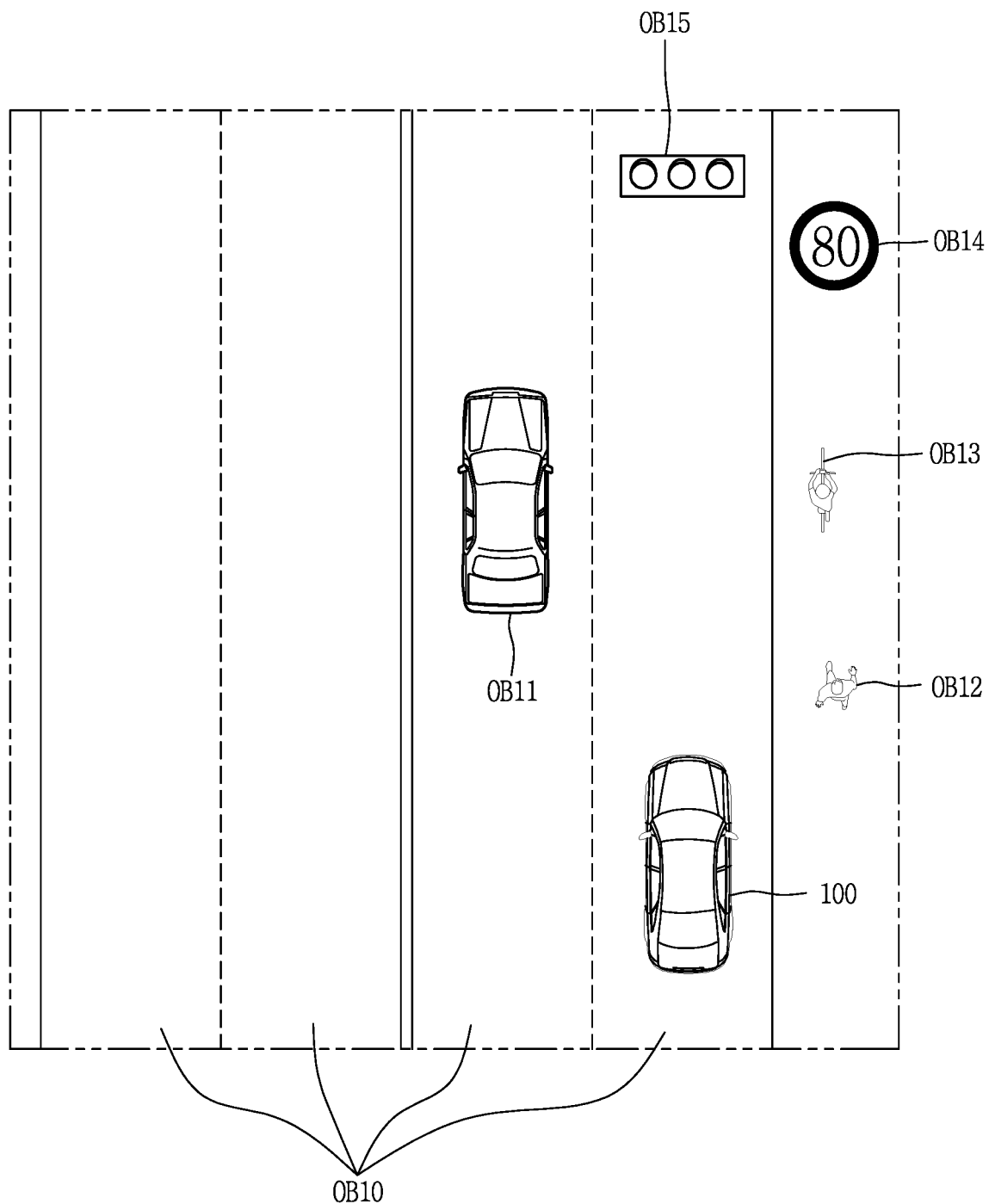
FIGS. 5 and 6 are views referenced to describe objects according to an embodiment of the present disclosure.
Figure 6:
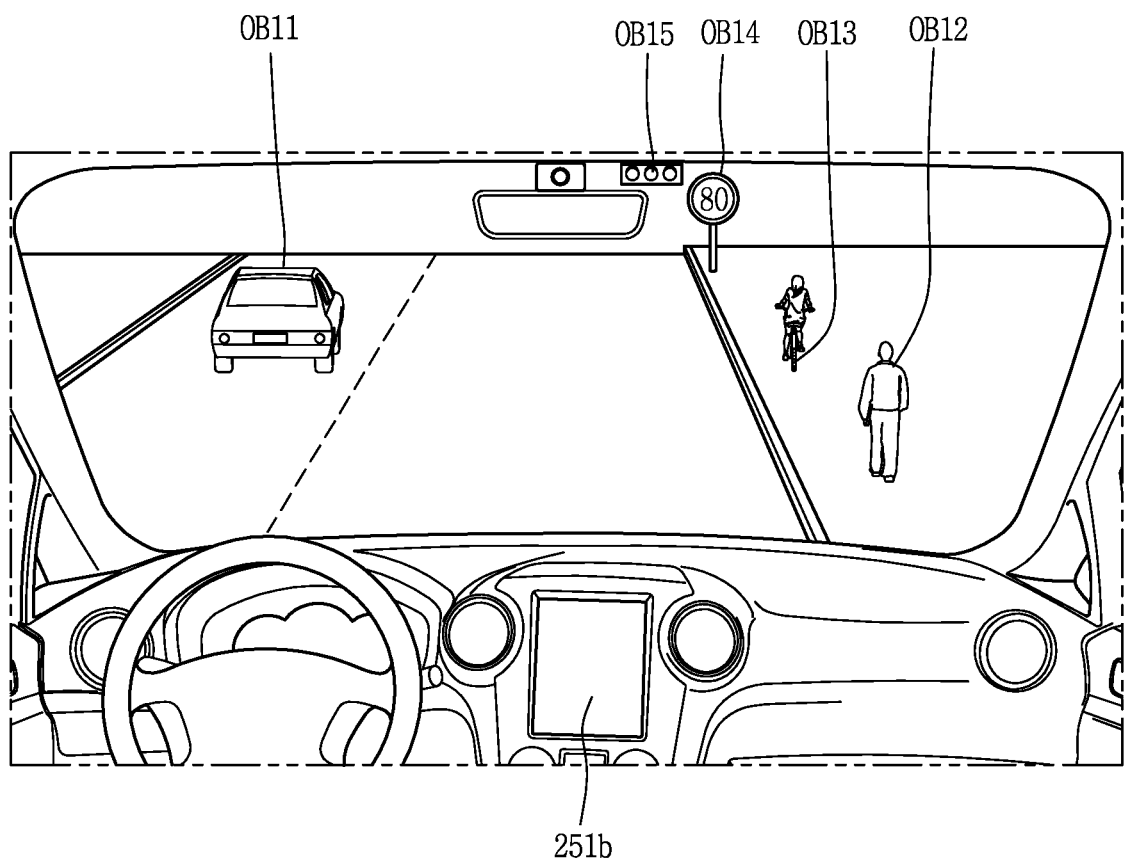

FIGS. 5 and 6 are views referenced to describe objects according to an embodiment of the present disclosure.

Figure 7:
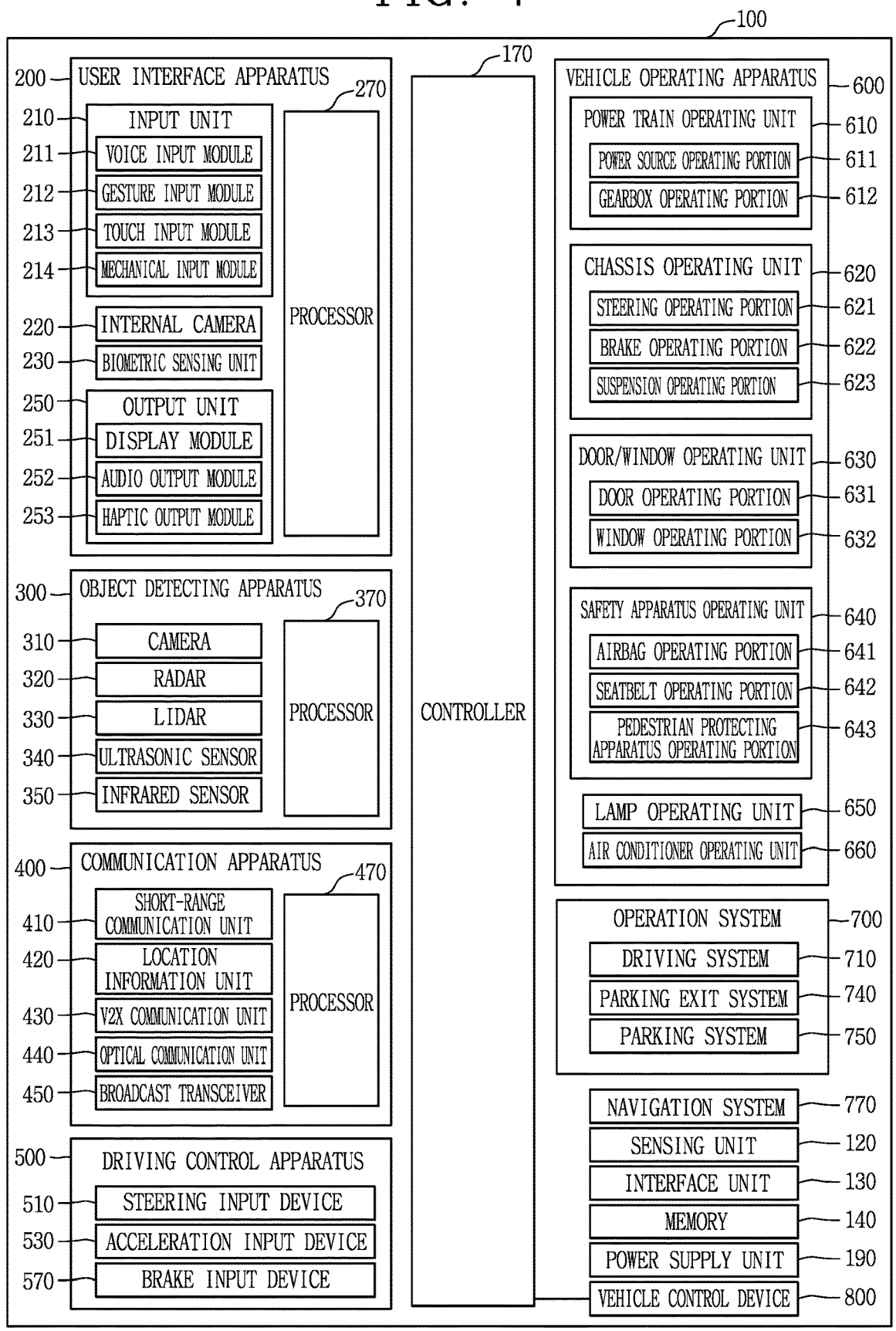
FIG. 7 is a block diagram referenced to describe a vehicle according to an embodiment of the present disclosure.

FIG. 7 is a block diagram referenced to describe a vehicle according to an embodiment of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

In addition, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In addition, the user interface apparatus 200 may be referred to as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In addition, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a lidar 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310(*a*), an AVM (Around View Monitoring) camera 310(*b*), or a 360-degree camera.

For example, the camera 310 may be disposed adjacent to a front windshield within the vehicle to acquire a front image of the vehicle. Alternatively, the camera 310 may be disposed adjacent to a front bumper or a radiator grill.

For example, the camera 310 may be disposed adjacent to a rear glass within the vehicle to acquire a rear image of the vehicle. Alternatively, the camera 310 may be disposed adjacent to a rear bumper, a trunk or a tail gate.

For example, the camera 310 may be disposed adjacent to at least one of side windows within the vehicle to acquire a side image of the vehicle. Alternatively, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle.

The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The radar 330 may detect an object in a time of flight (TOF) manner or a phase-shift manner through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In addition, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

In addition, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In addition, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The airbag operating portion 621 may perform an electronic control for an airbag apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In addition, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In addition, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to embodiments, the operation system 700 may further include other components in addition to components to be described, or may not include some of the components to be described.

In addition, the operation system 700 may include a processor. Each unit of the operation system 700 may individually include a processor.

According to embodiments, the operation system may be a sub concept of the controller 170 when it is implemented in a software configuration.

In addition, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In addition, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In addition, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

In addition, the vehicle control device 800 described in the present specification may include all types of devices capable of controlling the vehicle, and may be, for example, a mobile terminal. When the vehicle control device 800 is a mobile terminal, the mobile terminal and the vehicle 100 may be connected to each other to be communicable through wired/wireless communication. In addition, the mobile terminal may control the vehicle 100 in various ways in a communicatively connected state.

When the vehicle control device 800 is a mobile terminal, the processor 870 described herein may be a controller of the mobile terminal.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. In other words, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one embodiment of the present disclosure, with reference to the accompanying drawings.

Figure 8:
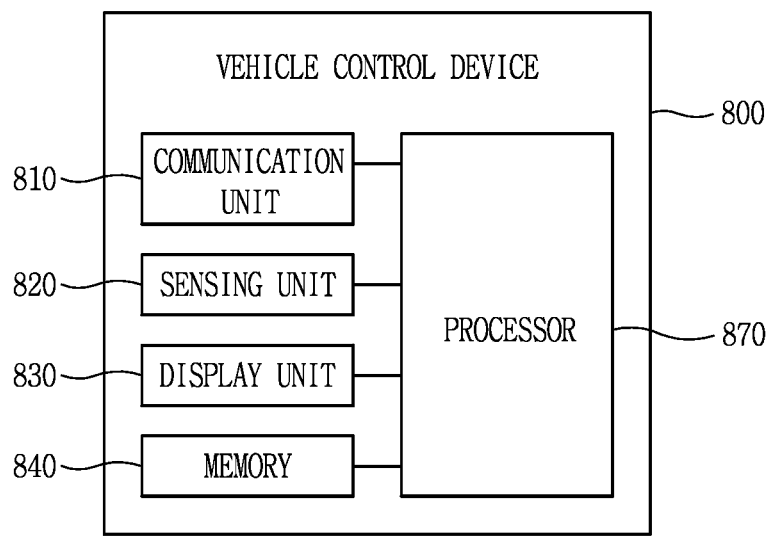
FIG. 8 is a conceptual view for explaining a vehicle control device according to an embodiment of the present disclosure.

FIG. 8 is a conceptual view for explaining a vehicle control device according to an embodiment of the present disclosure.

The vehicle control device 800 related to the present disclosure may include a communication unit 810, a sensing unit 820, a display unit 830, a memory 840, a processor 870, and the like.

First, the vehicle control device 800 related to the present disclosure may include the communication unit 810.

The communication unit 810 may be the foregoing communication apparatus 400. The communication unit 810 may be connected to communicate with a mobile terminal existing within the vehicle 100.

For example, the vehicle control device 800 (or vehicle 100) and the mobile terminal may be connected to enable wireless communication through the communication unit 810. When the vehicle control device 800 and the mobile terminal are connected in a wireless manner to enable mutual wireless communication at the user's request or have previously been connected to enable wireless communication, they may be connected in a wireless manner to enable mutual wireless communication based on the mobile terminal entering an inside of the vehicle.

The communication unit 810 may be provided in the vehicle (or in the vehicle control device), or may be formed in a separate module form to enable communication (or electrical coupling) with the components of the vehicle.

The vehicle control device 800 may control the mobile terminal 900 through the communication unit 810.

Specifically, the vehicle control device 800 may transmit a control signal for controlling the mobile terminal 900 to the mobile terminal 900 through the communication unit 810. When the control signal is received, the mobile terminal 900 may perform a function/operation/control corresponding to the control signal.

Conversely, the present disclosure may allow the mobile terminal 900 to control the vehicle control device 800 (or vehicle 100). Specifically, the mobile terminal 900 can transmit a control signal for controlling the vehicle to the vehicle control device 800. In response to this, the vehicle control device 800 may perform a function/operation/control corresponding to the control signal transmitted from the mobile terminal 900.

Furthermore, the communication unit 810 may perform communication with an external device (for example, a server, a cloud server (or cloud), the Internet, and the like) existing outside the vehicle. Furthermore, the communication unit 810 may perform communication with another vehicle.

The vehicle control device 800 related to the present disclosure may include the sensing unit 820. The sensing unit 820 may be the object detecting apparatus 300 described with reference to FIG. 7 or the sensing unit 120 provided in the vehicle 100.

The sensing unit 820 may be implemented by combining at least two of the camera 310, the radar 320, a lidar 330, the ultrasonic sensor 340, the infrared sensor 350, and the sensing unit 120 included in the object detecting apparatus 300.

The sensing unit 820 may sense information related to the vehicle 100 of the present disclosure.

The information related to the vehicle may be at least one of vehicle information (or driving state of the vehicle) and surrounding information of the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user gets on the vehicle, and information associated with the user (for example, whether or not the user is an authenticated user), and the like.

The surrounding information of the vehicle may be a state of road surface (frictional force) on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, ambient brightness, a temperature, a position of the sun, nearby subject (a person, another vehicle, a sign, etc.) information, a type of driving road surface, a landmark, line information, driving lane information), and information required for an autonomous driving/autonomous parking/automatic parking/manual parking mode.

In addition, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Also, the information related to the vehicle may include whether or not the mobile terminal is placed on a cradle provided in the vehicle, whether or not the mobile terminal has entered (exists) in the vehicle or whether the mobile terminal has entered (exists) within a predetermined distance from the vehicle, whether or not the mobile terminal and the vehicle control device are communicatively connected, and the like.

Information related to the vehicle sensed through the sensing unit 820 may be used in an autonomous driving mode for autonomous driving of the vehicle. Specifically, the processor 870 may allow the vehicle to perform autonomous driving using information related to the vehicle sensed through the sensing unit 820.

Furthermore, the vehicle control device 800 associated with the present disclosure may include the display unit 830.

The display unit 830 included in the vehicle control device 800 associated with the present disclosure may be the display module 251 described above as a display apparatus provided in the vehicle 100.

The display unit 830 may be the output unit 250 or the display module 251 illustrated in FIG. 7. Furthermore, the display unit 830 may include an output unit (e.g., a touch screen) of a mobile terminal that is communicable with the communication apparatus 400.

Moreover, the display unit 830 may include a transparent display. The transparent display may be attached to the windshield or the window.

The display unit 830 may be disposed on one area of a steering wheel, one area 251a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

For example, the display unit 830 may include a cluster, a center information display (CID), a navigation device, and a head-up display (HUD), and the like.

The display unit 830 may be inter-layered or integrated with a touch sensor to implement a touch screen. The touch screen functions as an input unit 210 that provides an input interface between the vehicle 100 (or vehicle control apparatus 800) and the user, and at the same time, provides an output interface between the vehicle 100 (or vehicle control apparatus 800) and the user.

The processor 870 may display various information related to the vehicle on the display unit 830. In addition, the processor 870 may display information related to the vehicle on a different position of the display unit 830 according to a type of the information related to the vehicle.

Various information displayed on the display unit 830 will be described later in detail with reference to the accompanying drawings.

The display unit 830 may be a navigation system 770 (or a navigation device). Furthermore, the display unit 830 may include the navigation system 770.

In other words, the display unit 830 may denote a navigation device provided in the vehicle 100, and the navigation device may be integrated into the vehicle 100 from the shipment of the vehicle 100 or may be a navigation device mounted by the user.

The display unit 830 may denote a navigation system for a vehicle, and may denote a navigation system independent of the navigation system provided in the mobile terminal 900.

The description of the display unit 830 in this specification may be applied to the navigation system 770, the navigation apparatus or the vehicle navigation system in the same or similar analogy.

Furthermore, the vehicle control device 800 associated with the present disclosure may include the memory 840.

The memory 840 may be the memory 140 illustrated in FIG. 7.

Various information may be stored (recorded) in the memory 840. For example, information related to the vehicle sensed through the sensing unit 820 may be stored in the memory 840.

The memory may be formed to store, change or delete information under the control of the processor 870.

On the other hand, when the vehicle has driven in a manual driving mode under the control of the processor 870, information related to driving learned through manual driving may be stored in the memory 840.

The information related to driving may include driving information from when the vehicle is driven in a manual driving mode.

Learning described herein may include the meaning of storage, recording or generation. For example, learning information related to driving through manual driving may include the meaning of storing driving information in which the vehicle has driven in a manual driving mode in the memory or storing (generating, recording) information related to driving that the vehicle has driven in a manual driving mode in the memory.

The contents related to driving (or driving information) will be described in more detail with reference to the accompanying drawings.

The information related to driving learned through manual driving (or driving information that has been driven in a manual driving mode) may be used in the autonomous driving mode of the vehicle.

Furthermore, the vehicle control device 800 of the present disclosure may include a processor 870 capable of controlling the communication unit 810, the sensing unit 820, the display unit 830, the memory 840, and the like.

The processor 870 may be the controller 170 described with reference to FIG. 7.

The processor 870 may control the constituent elements described in FIG. 7 and the constituent elements described in FIG. 8.

In addition, the processor 870 may store driving information (information related to driving that the vehicle 100 has learned through manual driving) that the vehicle 100 drives in a manual driving mode in the memory. Then, the processor 870 may drive the vehicle 100 in an autonomous driving mode based on the stored driving information (or information related to driving).

Hereinafter, with reference to the accompanying drawings, an optimized method for autonomously driving the vehicle of the present disclosure will be described in more detail.

Figure 9:
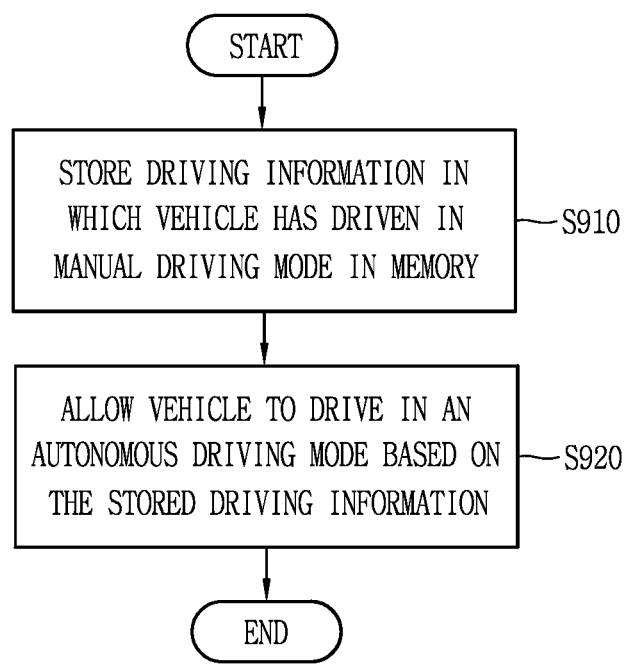
FIG. 9 is a flowchart for explaining a representative control method according to an embodiment of the present disclosure.

FIG. 9 is a flowchart for explaining a representative control method according to an embodiment of the present disclosure, and FIGS. 10, 11, 12, 13, 14, 15, 16 and 17 are conceptual views for explaining the control method illustrated in FIG. 9 according to embodiments of the present disclosure.

First, referring to FIG. 9, in the present disclosure, the process of storing driving information in which the vehicle has driven in a manual driving mode is carried out (S910).

The processor 870 of the present disclosure may store information related to driving learned through manual driving in the memory 840. As described above, the learning of the information related to the driving may include the meaning of storing driving information that has been driven in a manual driving mode.

In other words, the information related to driving may include driving information (or driving route information).

The processor 870 may store driving information in which the vehicle has driven in a manual driving mode in the memory 840.

Specifically, the processor 870 may store driving information in which the vehicle 100 drives in a manual driving mode from a first point to a second point different from the first point in the memory 840.

Furthermore, the processor 870 may drive the vehicle in an autonomous driving mode based on the stored driving information, based on the vehicle 100 that arrives at the first point.

In other words, when driving information from when the vehicle has been driven in a manual driving mode from the first point to the second point is stored in the memory 840, and subsequently the vehicle 100 is located again at the first point, the processor 870 may allow the vehicle to perform autonomous driving based on the stored driving information.

Then, in the present disclosure, the process of driving the vehicle in an autonomous driving mode is carried out based on driving information (e.g., driving information from previous driving in a manual driving mode or driving information learned through manual driving) stored in the memory.

The vehicle control device 800 associated with the present disclosure may allow the vehicle to perform autonomous driving using driving information from when the vehicle was driven in a manual driving mode.

Here, the driving information that has been driven in a manual driving mode may denote information that has been manually driven from the first point to the second point by the vehicle or another vehicle through the manual driving mode.

Here, the first point denotes a starting point (S/P) at which the vehicle starts manual driving in a manual driving mode and the second point denotes an ending point (E/P) at which the vehicle ends manual driving in the manual driving mode.

In other words, driving information that has been driven in the manual driving mode may include a starting point at which the vehicle starts driving in a manual driving mode, an ending point at which the manual driving mode ends, and a driving route from the starting point to the ending point.

When the vehicle 100 is moved to the starting point in a manual driving mode, the processor 870 may allow the vehicle 100 to perform autonomous driving along the driving route from along the traveling path from the starting point to the ending point.

In other words, in the present specification, allowing the vehicle to perform autonomous driving using driving information that has been driven in a manual driving mode may denote allowing the vehicle to drive along a driving route included in the driving information from the starting point to the ending point included in the driving information.

The vehicle control device 800 associated with the present disclosure may learn driving information from when the vehicle is driven in a manual driving mode. Here, learning may denote generating information (e.g., information related to driving) driving through manual driving and storing the information in the memory.

The driving information from driving in the manual driving mode may be generated by another vehicle, and received from another vehicle or an external device (for example, a server, the Internet, a cloud server, a mobile terminal, etc.) via the communication unit 810.

The process of learning (storing) driving information from driving in a manual driving mode will be described in more detail.

The processor 870 of the present disclosure may store information related to driving learned through manual driving in the memory 840. As described above, learning the information related to driving may include storing driving information that has been driven in a manual driving mode.

In other words, the information related to driving may include driving information (or driving route information).

The processor 870 may store driving information in which the vehicle has driven in a manual driving mode in the memory 840.

Specifically, the processor 870 may store driving information in which the vehicle 100 drives in a manual driving mode from a first point (starting point) to a second point (ending point) different from the first point in the memory.

Furthermore, the processor 870 may drive the vehicle in an autonomous driving mode based on the stored driving information, when the vehicle 100 arrives at the first point.

In other words, when driving information from driving in a manual driving mode from the first point to the second point is stored in the memory, and subsequently the vehicle 100 is located again at or returns to the first point, the processor 870 can drive the vehicle in an autonomous driving mode based on the stored driving information.

At this time, the processor 870 may allow the vehicle to perform autonomous driving in a driving mode in which the vehicle has driven in a manual driving mode, based on the stored driving information.

In other words, allowing the vehicle to perform autonomous driving based on driving information stored in the memory (or driving information received through the communication unit) in the present specification may denote allowing the vehicle to perform autonomous driving in a driving mode that has been driven in a manual driving mode (or in a driving route, in a driving pattern, or in a driving mode as it is) other than allowing the vehicle to perform autonomous driving while generating a route to enable autonomous driving in real time using the sensor.

In other words, allowing the vehicle to perform autonomous driving based on driving information stored in the memory according to the present specification may denote allowing the vehicle to perform autonomous driving in a driving mode (or in a driving mode) in which driving information that has been driven in a manual driving mode has been driven in the manual driving mode as it is.

In other words, the processor 870 may allow the vehicle to perform autonomous driving in a driving mode that has been driven in a manual driving mode using driving information that has been driven in the manual driving mode as it is.

On the other hand, the processor 870 may allow the vehicle to perform autonomous driving along a driving route that was previously driven in a manual driving mode using driving information for the previous driving.

When the vehicle is driven in an autonomous driving mode based on driving information in which the vehicle has driven in a manual driving mode, when driving a specific section (for example, a section between the first point and the second point), the vehicle of the present disclosure may perform autonomous driving on the specific section with the same trajectory (or course, route), or repeatedly perform autonomous driving on the specific section in the same (same) driving manner (or driving pattern) every time.

The driving information (driving route information) that has been driven in a manual driving mode may include at least one of driving trajectory information in which the vehicle has driven and driving pattern information of the vehicle.

The driving trajectory information may include location information of a plurality of points at which the vehicle has been located. Specifically, the driving trajectory information may denote a manual driving route of the vehicle 100 connecting a plurality of points that the vehicle 100 has driven in a manual driving mode.

The processor 870 may generate the driving trajectory information from when the vehicle was driven in a manual driving mode using the location information of the vehicle received through the location information unit.

Furthermore, the processor 870 may generate the driving trajectory information of the vehicle using a number of rotations of the wheels of the vehicle being driven in a manual driving mode, an angle of the wheels, and the like without using the location information unit. At this time, the first point (starting point) and the second point (ending point) may be determined by the location information unit.

In addition, the driving pattern information may include at least one of steering angle information (rotation angle of the steering wheel) for each of the plurality of points and a speed (vehicle speed) for each of the plurality of points.

Also, the driving pattern information may include whether or not the gas pedal is pressed, a degree of pressure of the gas pedal, whether or not the brake is pressed, a degree of pressure of the brake, and the like, for each of the plurality of points.

In other words, the driving pattern information may be associated with whether or not the brake is pressed, whether or not the gas pedal is pressed, a degree of pressure of the brake, a degree of pressure of the gas pedal, and the like, for each point of the driving trajectory.

Since information related to driving described above includes driving information (or driving route information), at least one of the driving trajectory information (location information of a plurality of points) and the driving pattern information (steering angle information or speed information for each of the plurality of points) is included in the information related to driving.

In addition, sensor data sensed through the sensing unit 820 when driving in a manual driving mode may be included in the information related to driving (or driving information from driving in a manual driving mode).

The sensor data may include information related to a vehicle sensed for each point where the vehicle drives in a manual driving mode.

The sensor data may include the foregoing information related to the vehicle. In addition, the processor 870 may be associated with sensor data for each point (or for each time) of the vehicle driving in a manual driving mode.

The processor 870 may store (generate) driving information in which the vehicle 100 has driven in a manual driving mode in the memory, based on the state of the vehicle 100 satisfying a preset condition. The preset condition may denote a condition associated with a function of starting to store driving information that has driven in a manual driving mode in the memory.

The preset condition may include various conditions, for example, may include the following conditions.

For example, when there is a user request, the processor 870 may start storing (generating) driving information that has driven in a manual driving mode. In other words, the processor 870 may store (or start storing) driving information (information related to driving) that has driven in a manual driving mode in the memory, based on the user request.

For another example, when the vehicle arrives at a point where the vehicle is unable to perform autonomous driving using the sensing unit 820 (or when the vehicle enters a road where the vehicle is unable to perform autonomous driving using the sensing unit 820), the processor 870 may store (or start storing) driving information that has been driven in a manual driving mode in the memory.

For still another example, when the location information of the vehicle through the communication device 400 is not received (e.g., GPS information is not received), the processor 870 may store (or start storing) driving information from driving in a manual driving mode in the memory.

For yet still another example, when the surrounding environment of the vehicle 100 is in a state where the autonomous driving of the vehicle using the sensing unit 820 is disabled, the processor 870 may store (start storing) driving information that is been driven in a manual driving mode in the memory.

For still yet another example, when sensor data included in information related to driving (or driving information that has been driven in a manual driving mode) and sensor data sensed through the sensing unit 820 while driving the vehicle in an autonomous driving mode along driving information from previous driving in a manual driving mode stored in the memory are different from each other, the processor 870 may store (or start storing) new driving information in which the vehicle drives in a manual driving mode in the memory.

There are various situations where the sensor data are different from each other, such as situations where a new object is sensed, an existing object disappears, a road disappears, a road is deformed, or a road on which the vehicle has driven in a manual driving mode is blocked by an obstacle, and the like.

The sensor data may include the surrounding environment information of the vehicle when the vehicle drives in a manual driving mode. The processor 870 may store the surrounding environment information from previous driving in a manual driving mode in the memory to be included in driving information using the sensor data.

Furthermore the processor 870 may generate map data of the vehicle that has driven in a manual driving mode using the sensor data. For example, the map data may be generated based on information on surrounding objects (e.g., trees, signs, buildings or road conditions (e.g., whether or not it is an unpaved road, whether or not snow is piled up, whether or not fallen leaves are piled up, and the like)).

The processor 870 may generate map data using the sensor data, and generate driving information by linking driving trajectory information or driving pattern information in which the vehicle has driven in a manual driving mode to the relevant map data.

In addition, the processor 870 may store driving trajectory information in which the vehicle has driven in a manual driving mode or driving information generated to link driving pattern information to map data in the memory.

Also, the processor 870 may store driving information that has been driven in a manual driving mode in the memory according to various situations.

In other words, when the state of the vehicle 100 satisfies the preset condition, the processor 870 may start learning about driving information that has been driven in a manual driving mode (e.g., start learning about information related to driving through manual driving).

The processor 870 may determine a point (location) of the vehicle 100 located at a time point when the state of the vehicle 100 satisfies the preset condition as the first point. In other words, the first point may denote a starting point (starting place) of the driving information that has been driven in a manual driving mode.

There may be a plurality of driving information (information related to driving) stored in the memory, and the first point may vary according to a point of the vehicle 100 located at a time point that satisfies the preset condition.

On the other hand, the processor 870 may determine a point where the vehicle 100 is located at a time point when the state of the vehicle satisfies a specific condition as the second point. In other words, the second point may denote an end point of driving information that has been driven in a manual driving mode.

The specific condition is, for example, a condition in which the vehicle is turned off, the vehicle is stopped for a predetermined time, a vehicle door is open after the vehicle is turned off, a new user input (for example, a user input for terminating learning of driving information, etc.) is received, or the like.

The second point may vary depending on the point of the vehicle 100 located at a time point when the specific condition is satisfied.

Hereinafter, for the sake of convenience of explanation, a situation where information used for the vehicle to perform an autonomous driving mode is driving information (driving route information) from when the vehicle was previously driven in a manual driving mode will be described. In other words, in the following description, allowing the vehicle to drive in an autonomous driving mode based on driving information from being driven in a manual driving mode may be understood as allowing the vehicle to drive in a manual driving mode based on information related to driving learned through manual driving.

The processor 870 may allow the vehicle to perform autonomous driving based on driving information that has been driven in a manual driving mode. At this time, allowing the vehicle to drive in an autonomous driving mode based on driving information that has been driven in a manual driving mode may be named as learning autonomous driving, a learning autonomous driving mode, learning-based autonomous driving, a learning-based autonomous driving mode, or the like.

At this time, the processor 870 may allow the vehicle to perform autonomous driving using sensor data included in driving information (or information related to driving) stored in the memory.

For example, the processor 870 may allow the vehicle to perform autonomous driving in a driving mode that has been driven in a manual driving mode according to driving information stored in the memory. At this time, when the sensor data included in the driving information stored in the memory is different from the sensor data sensed through the sensing unit 820 while performing autonomous driving, the processor 870 may stop autonomous driving (learning autonomous driving). In this situation, the vehicle may be stopped.

In addition, when it is sensed that the sensor data included in the driving information stored in the memory is different from the sensor data sensed through the sensing unit 820 while allowing the vehicle to perform autonomous driving according to driving information stored in the memory, the processor 870 may output notification information to notify the driver to switch to a manual driving mode.

On the contrary, allowing the vehicle to perform autonomous driving based on information related to sensed vehicle sensed through the sensing unit 820 may be named as sensor autonomous driving, a sensor autonomous driving mode, sensor-based autonomous driving, a sensor-based autonomous driving mode, or the like.

Then, the processor 870 may drive the vehicle in an autonomous driving mode based on the stored driving route. Specifically, when driving information that has been driven in a manual driving mode is stored in the memory (or when driving information that has been driven in a manual driving mode is received through the communication unit 810), the processor 870 may allow the vehicle to allow autonomous driving based on the driving information. Here, allowing the vehicle to drive in an autonomous driving mode based on the stored driving information may be understood as learning-based autonomous driving.

The vehicle control device 800 related to the present disclosure may allow the vehicle to perform autonomous driving in various ways when allowing the vehicle to perform autonomous driving in a learning-based autonomous mode.

Specifically, the processor 870 may allow the vehicle 100 to perform autonomous driving in accordance with either one of a first mode of allowing the vehicle to perform autonomous driving using only driving trajectory information included in driving information stored in the memory, and a second mode of allowing the vehicle 100 to perform autonomous driving according to driving trajectory information and driving pattern information included in the driving information.

For example, the processor 870 may allow the vehicle to perform autonomous driving using only driving trajectory information in driving information that has been driven in a manual driving mode (first mode).

In this situation, when storing (learning) driving information, the vehicle 100 may perform autonomous driving according to the driving trajectory information to have steering angle information and speed information different from steering angle information for each of the plurality of points and speed information for each of the plurality of points.

In other words, the processor 870 may allow the vehicle to perform autonomous driving so that the vehicle follows a trajectory through which the vehicle has passed when storing (learning) the driving information, but the steering angle and speed are different from those when storing (learning) the driving information.

At this time, the processor 870 may determine the steering angle and speed using information related to the vehicle sensed through the driving trajectory information and the sensing unit, and allow the vehicle to perform autonomous driving according to the determined steering angle and speed.

For another example, the processor 870 may allow the vehicle to perform autonomous driving according to driving trajectory information and driving pattern information included in driving information (second mode).

In this situation, the processor 870 may allow the vehicle to perform autonomous driving to have the same trajectory, steering angle, and speed as route information from previous driving in a manual driving mode. In other words, the processor 870 may allow the vehicle 100 to perform autonomous driving so that the trajectory and driving pattern of the vehicle is the same as those when learning driving information.

On the contrary, the processor 870 may use information related to the vehicle sensed through the sensing unit 820 even when the vehicle performs autonomous driving in a second mode. It is because, when it is changed to an environment different from that when storing (learning) driving information, it may occur a situation where there exists an obstacle or a road has been changed. In this situation, when the vehicle performs autonomous driving according to the second mode, there is a high possibility of leading to an accident.

Accordingly, even when the vehicle performs autonomous driving according to the driving trajectory information and the driving pattern information included in the driving information, in a situation where an obstacle is detected or a road is changed (or a road or a lane has changes so that the vehicle is now unable to pass) through the sensing unit 820, the processor 870 may stop autonomous driving.

At this time, the processor 870 may output to the driver notification information indicating that the vehicle cannot be driven in an autonomous driving mode or notification information for guiding the driver to switch to a manual driving mode.

Whether or not to perform autonomous driving in the first mode or perform autonomous driving in the second mode when performing the learning-based autonomous driving may be determined according to various conditions.

For example, based on the current location of the vehicle 100, the processor 870 may allow the vehicle to perform autonomous driving in the first mode when the autonomous mode is possible in the first mode, and allow the vehicle to perform autonomous driving in the second mode when the autonomous mode is possible in the second mode For another example, when the vehicle 100 is located at or returns to a position where autonomous driving is possible in both the first mode and the second mode, the processor 870 may output information for asking a selection between the first and second modes, and allow the vehicle to perform autonomous driving in either one of the first and second modes based on a user input.

For still another example, the processor 870 may allow the vehicle to perform autonomous driving in either one of the first and second modes, based on whether or not the driver has boarded the vehicle 100.

For example, when the driver has boarded the vehicle 100, the processor 870 may allow the vehicle to perform autonomous driving in the first mode, and when the driver has not boarded on the vehicle 100, the processor 870 may allow the vehicle to perform autonomous driving in the second mode.

For another example, the processor 870 may allow the vehicle to perform autonomous driving in either one of the first and second modes, based on whether or not the vehicle has been driven in a sensor-based autonomous mode before autonomously driving the vehicle in a learning-based autonomous mode.

For example, the processor 870 may allow the vehicle to perform autonomous driving in the first mode when the vehicle has been driven in a sensor-based autonomous mode before autonomously driving the vehicle in a learning-based autonomous mode. It is because the reliability of the sensor can be seen as a reliable condition.

On the contrary, the processor 870 may allow the vehicle to perform autonomous driving in the second mode when the vehicle has not been driven in a sensor-based autonomous mode before autonomously driving the vehicle in a learning-based autonomous mode.

In addition, the processor 870 may allow the vehicle to perform autonomous driving in the first mode when a preset situation occurs (for example, when an obstacle occurs or a road is changed) while allowing the vehicle to perform autonomous driving in the second mode.

Figure 10:
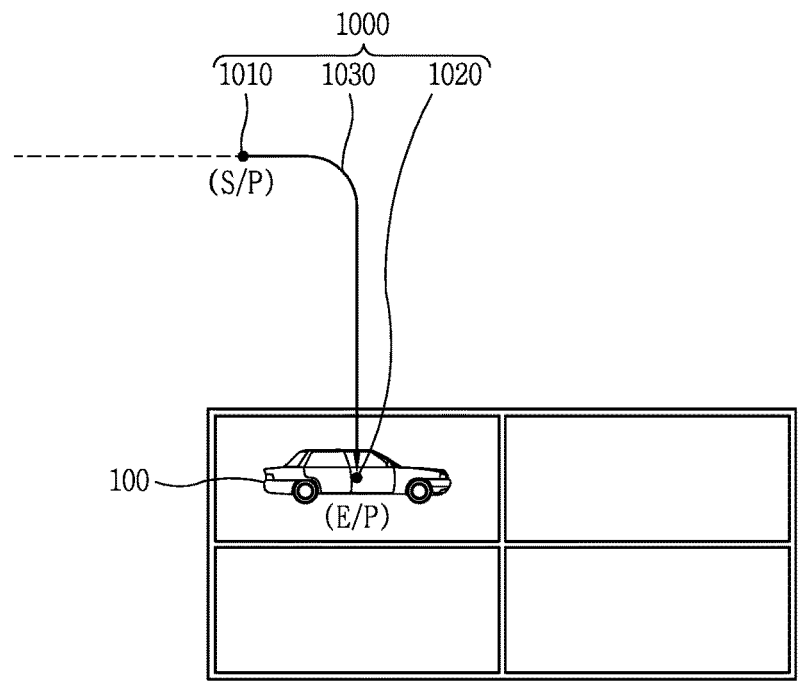
FIGS. 10, 11, 12, 13, 14, 15, 16, and 17 are conceptual views for explaining a control method illustrated in FIG. 9 according to embodiments of the present disclosure.
Figure 10:
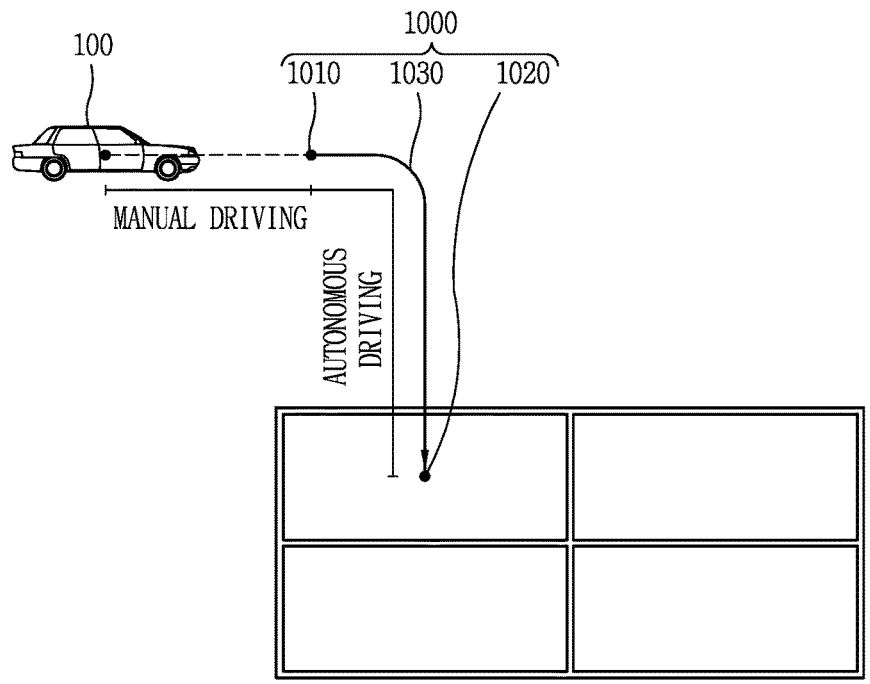

The above description will become more apparent with reference to FIG. 10.

Referring to FIG. 10, the processor 870 may store driving information that has been driven in a manual driving mode in the memory.

For example, as illustrate in FIG. 10(*a*), the processor 870 may store a driving route that has been driven from a starting point (first point) 1010 to an ending point (second point) 1020 in a manual driving mode in the memory as driving information.

In addition, the processor 870 may receive driving information from another vehicle that has driven in a manual driving mode from the mobile terminal or the external device through the communication unit 810.

The driving information 1000 that has been driven in a manual driving mode may include a starting point (S/P) 1010 at which the vehicle starts a manual driving mode, an ending point (E/P) 1020 at which the vehicle ends the manual driving mode, and a driving route 1030 from the starting point 1010 to the ending point 1020.

Then, as illustrated in FIG. 10(*b*), when the vehicle 100 is moved to the starting point 1010 by manual driving, the processor 870 may allow the vehicle 100 to perform autonomous driving along the driving route 1030 from the starting point 1010 to the end point 1020.

For example, when the driving information that has been driven in a manual driving mode exists around the current vehicle 100, and the vehicle 100 is located at the starting point of the driving information, the processor 870 may allow the vehicle 100 to perform autonomous driving along the driving route included in the driving information.

On the other hand, when driving information is learned through manual driving, in a situation where the vehicle drives while violating traffic regulations, the learned driving information includes violations of the traffic regulations.

In other words, when allowing the vehicle to perform autonomous driving using driving information manually driven in violation of traffic regulations, the vehicle drives autonomously while violating the traffic regulations. In this situation, the risk of traffic accidents increases.

The present disclosure may process the relevant driving information in an optimized manner when the vehicle is driving in violation of the traffic regulations while learning driving information through manual driving.

Furthermore, when the vehicle has been driven in accordance with traffic regulations when driving information is learned through manual driving, but thereafter the traffic regulations are changed, the state of a road is changed, the type of a line drawn on a road is changed, a traffic light is additionally installed or the like, a situation in violation of traffic regulations may occur in at least some sections.

In addition, according to the present disclosure, when receiving driving information learned by another vehicle from an external device (e.g., a mobile terminal, a server, another vehicle, a cloud server, an infrastructure, etc.) through a communication unit, it may be a problem whether or not the driving information has been driven while complying with traffic regulations from the starting point to the ending point.

The present disclosure may provide an optimized control method capable of correcting driving information to comply with traffic regulations even when the traffic regulations are changed or driving information received from an external device violates the traffic regulations.

In the memory 840 of the vehicle control device 800, information related to traffic regulations may be stored in advance.

Information related to traffic regulations may include all information related to traffic regulations, such as road speed limits for each section, lane types, disabled parking areas, and front parking/rear parking areas, and the like.

The information related to traffic regulation may be stored in advance in the memory 840 or received from an external device through the communication unit 810.

The processor 870 may determine whether or not driving information violates (complies with) traffic regulations based on information related to the traffic regulations while learning (generating) the driving information through manual driving.

Here, determining whether or not driving information violates (complying with) traffic regulations may be understood as determining whether or not the vehicle violates (complies with) the traffic regulations while manually driving through a manual driving mode.

In other words, driving information that has been driven in a manual driving mode violating (complying with) traffic regulations may be understood as violating (complying with) the traffic regulations when the vehicle is driven according to the driving information.

The processor 870 may determine whether or not there is a section in which the vehicle violates traffic regulations in real time while learning driving information through manual driving.

Furthermore, when driving is completed in a manual driving mode from a first point (starting point) to a second point (ending point), the processor 870 may generate driving information in which the vehicle has driven in a manual driving mode from the first point to the second point different from the first point, and determine a section in which the vehicle violates traffic regulations between the first point and the second point based on information related to the traffic regulations.

Specifically, the processor 870 determine whether or not there is a section in which the vehicle violates traffic regulations while driving in a manual driving mode between the first point and the second point based on driving information learned from the first point to the second and information related to traffic regulation (by comparing the driving information and the information related to traffic regulations).

The processor 870 may process the generated (learned) driving information in different ways based on the section in which the vehicle has violated traffic regulations.

At this time, the processor 870 may not store the generated driving information in the memory before the vehicle determines whether or not there exists a section in which the vehicle has violated traffic regulations while driving in a manual driving mode between the first point and the second point. At this time, the processor 870 may generate driving information learned between the first point and the second point, and temporarily store the generated driving information.

Figure 11:
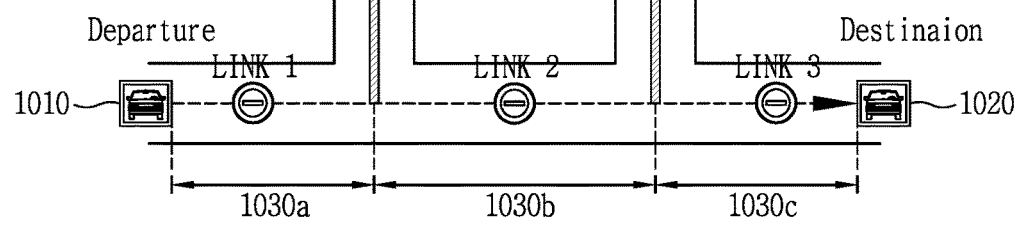
Figure 11:
Figure 11:
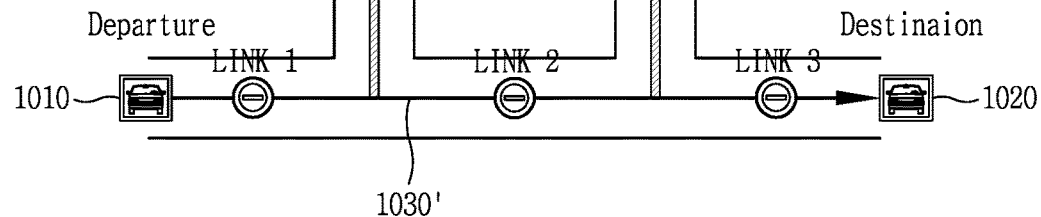

As illustrated in FIG. 11(*a*), when the vehicle 100 violates traffic regulations in entire sections (Link 1, Link 2, Link 3) between the first point 1010 and the second point 1020, the generated driving information 1030*a*, 1030*b*, 1030*c* may not be stored in the memory 840.

In other words, as illustrated in FIG. 11(*a*), the processor 870 may not store driving information generated in entire sections when the vehicle performs manual driving in violation of traffic regulations in the entire section that has been driven in a manual driving mode (an entire section between the first point 1010 and the second point 1020).

Furthermore, the processor 870 may output information for notifying the user to regenerate driving information between the first point 1010 and the second point 1020 through the output unit (e.g., display unit 151) through new manual driving (e.g., retrain with another manual driving attempt).

In other words, when driving information that has been driven in a manual driving mode in the entire sections between the first point 1010 and the second point 1020 violates information on traffic regulations, the processor 870 may not store the driving information in the memory 840, and may output information for requesting to perform new learning through new manual driving in the entire sections between the first point 1010 and the second point 1020 (e.g., to generate new driving information through new manual driving) to the output unit.

Then, when the vehicle generates driving information 1030' that complies with traffic regulations through new manual driving in the entire sections from the first point 1010 to the second point 1020, the processor 870 store the driving information 1030' learned through the new manual driving (e.g., driving information that has been driven for the entire sections between the first point 1010 and the second point 1020 while complying with traffic regulations) as illustrated in FIG. 11B.

Then, when the vehicle 100 is located again at the first point 1010, the processor 870 may allow the vehicle 100 to perform autonomous driving from the first point 1010 to the second point 1020 using the driving information 1030'.

Figure 12:
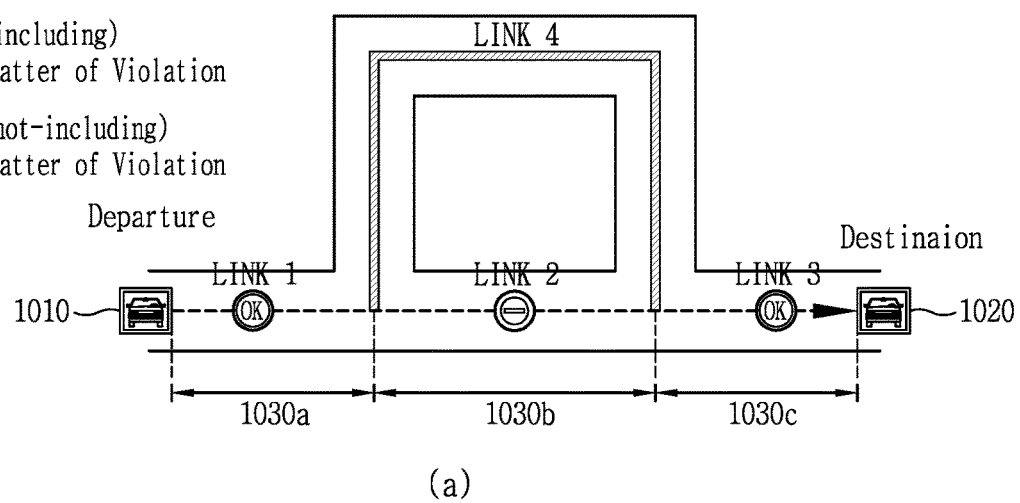
Figure 12:
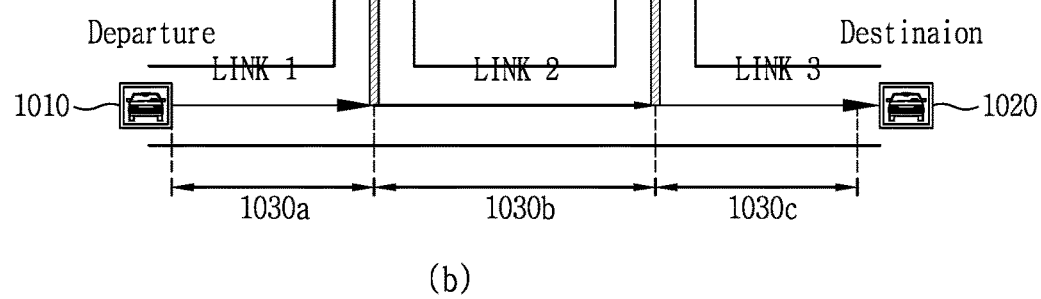

On the other hand, referring to FIG. 12(*a*), there may be a situation where the vehicle 100 violates traffic regulations in a partial section between the first point 1010 and the second point 1020 that has been driven in a manual driving mode.

When the vehicle violates traffic regulations in a partial section (e.g., Link 2) between the first point 1010 and the second point 1020, the processor 870 may not store driving information 1030*b* generated from the partial section (Link 2) among driving information that has been driven in a manual driving mode from the first point to the second point in the memory 840, and may store driving information 1030a, 1030c generated from the sections (Link 1, Link 3) that comply with traffic regulations in the memory 840.

Specifically, when the vehicle has driven in a manual driving mode from the first point 1010 to the second point 1020, as illustrated in FIG. 12(a), the processor 870 may determine that driving information 1030b generated from a partial section (Link 2) among a plurality of sections (Link 1, Link 2, Link 3) between the first point 1010 and the second point 1020 violates traffic regulation based on information related to the traffic regulations.

At this time, the processor 870 may not store the driving information 1030b generated from the partial section (Link 2) in the memory. In addition, the processor 870 may store driving information 1030a, 1030c generated from the sections (Link1, Link3) that comply with traffic regulations in the memory 840.

In other words, when the vehicle violates traffic regulations in a partial section between the first point and the second point, the processor 870 may partition and selectively store driving information learned through manual driving between the first point and the second point for each section.

In this situation, when the vehicle is located again at the first point 1010, the processor 870 may allow the vehicle to perform autonomous driving for the sections (Link 1, Link 3) in which driving information 1030a, 1030c is stored in the memory 840 based on the driving information 1030a, 1030c that has been driven in a manual driving mode.

In addition, the processor 870 may allow the vehicle to drive in a manual driving mode for the partial section (Link 2) in which driving information 1030b is not stored. In this situation, the vehicle may be manually driven by the user's manual driving.

The processor 870 may learn manual driving when the vehicle performs the manual driving in the partial section (Link 2). In other words, the processor 870 may generate driving information while driving in a manual driving mode for the partial section (Link 2), and determine whether or not the driving information complies with traffic regulations based on information related to the traffic regulations.

Then, when the driving information generated from the partial section (Link 2) complies with traffic regulations, the processor 870 may store driving information 1030b' generated from the partial section (Link 2) in the memory 840.

In addition, when a plurality of driving information generated from entire sections between the first point 1010 and the second point 1020 comply with traffic regulations as driving information 1030b' regenerated (re-learned) through manual driving for the partial section (Link 2) complies with the traffic regulations, the processor 870 may combine the plurality of driving information 1030a, 1030b', 1030c into one driving information.

In addition, when the vehicle violates traffic regulations in a partial section between the first point 1010 and the second point 1020, the processor 870 may modify or correct driving information generated from the partial section in a preset manner and store the modified driving information in the memory 840.

Here, modifying the driving information generated in the partial section in a predetermined manner may include modifying driving information in a partial section based on information (driving information) received from another vehicle that has driven in the partial section before a predetermined time period or driving history in which the vehicle 100 has driven in the partial section in the past.

For example, the processor 870 may receive driving information that has been driven in a manual driving mode in the partial section from another vehicle through the communication unit 810. At this time, the processor 870 requests driving information generated by driving while observing traffic regulations in the partial section from another vehicle, and modify driving information that has been driven in the partial section based on the driving information received from the another vehicle.

For another example, the processor 870 may modify the driving information of the partial section, based on the driving history that has been driven in the partial section stored in the memory 840. At this time, the processor 870 may modify driving information in the partial section using driving information that has been driven while observing traffic regulations among driving information included in the driving history.

On the other hand, even when the vehicle violates traffic regulations in a partial section between the first point and the second point, the processor 870 may store driving information that has been driven in a manual driving mode from the first point to the second point as it is in the memory 840.

In this situation, driving information generated from the partial section among the driving information stored in the memory 840 may not comply with traffic regulations. Thereafter, the processor 870 may modify the driving information of the partial section based on a preset method when the vehicle is located again at the first point.

Here, the preset method may include modifying driving information in the partial section based on information received from another vehicle that has been driven for the partial section or driving history in which the vehicle has driven in the partial section in the past.

The processor 870 may process driving information generated from the partial section in different manners based on the state of the partial section.

Specifically, when driving information that has been driven in a manual driving mode in the partial section does not comply with traffic regulations, the processor 870 may not store the driving information generated from the partial section (a first mode), modify the driving information generated from the partial section in a preset manner (a second mode), or store the driving information generated from the partial section as it is even when not complying with the traffic regulations (a third mode) based on the state of the partial section.

For example, when driving information that complies with traffic regulations from another vehicle in the partial section is received or there exists a history that has been driven in the partial section in the past, the processor 870 may modify the driving information of the partial section in the second mode.

For another example, the processor 870 may generate driving information so as not to comply with traffic regulations in the partial section, and process the driving information in the first mode when the driving information cannot be modified.

For still another example, when there is a transmission request for driving information from another vehicle in the partial section, the processor 870 may store the driving information generated from the partial section in the third manner, and transmit the stored driving information to the another vehicle.

Here, even when the driving information does not comply with traffic regulations in the partial section, whether or not to modify the driving information may be determined by the another vehicle.

When the vehicle has driven in accordance with traffic regulations in entire sections between the first point 1010 and the second point 1020, the processor 870 may store driving information (e.g., generated driving information) that has been driven in a manual driving mode between the first point and the second point in the memory 840.

Through the forgoing configuration, the present disclosure may provide a new vehicle control method capable of processing learned driving information in various ways according to whether or not driving information learned from the time of learning the driving information through a manual driving mode complies with traffic regulations.

In the above, a method of processing driving information when there exists a section in violation of traffic regulations in a situation where the vehicle drives in a manual driving mode between the first point and the second point to generate (learn) driving information has been described.

Hereinafter, a method of processing driving information when the driving information stored in advance in the memory 840 does not comply with traffic regulations or when driving information received from another vehicle (an external server) does not comply with the traffic regulations will be described.

As described above, driving information stored in the memory 840 (e.g., driving information that has been driven in a manual driving mode by the vehicle/another vehicle) may be information in which the vehicle has driven from the first point to the second point or information that has been driven from the first point to the second point in a manual driving mode by another vehicle.

The information that has been driven in a manual driving mode by another vehicle may be received from an external device (a mobile terminal, the Internet, a cloud server (cloud), another vehicle, etc.) through the communication unit 810.

The received information (driving information) that has been driven in a manual driving mode by the another vehicle may be stored in the memory 840.

The processor 870 may detect whether or not there exists a section in which driving information violates traffic regulations between the first point and the second point, based on information related to the traffic regulations stored in the memory 840 and the driving information before allowing the vehicle 100 to perform autonomous driving from the first point 1010 to the second point 1020.

The processor 870 may detect whether or not there exists a section between the first point and the second point in which driving information violates traffic regulations based on a preset condition being satisfied (e.g., detect bad sections within the route information).

For example, the processor 870 may detect whether or not there exists a section in which driving information violates traffic regulations between the first point and the second point based on at least one of arriving at the first point of driving information in which the vehicle 100 has driven in the manual driving mode, selecting (touching) the driving information among a plurality of driving information displayed on the display unit 830, and receiving a user request.

The processor 870 may allow the vehicle to perform autonomous driving (learning-based autonomous driving) from the first point to the second point using driving information stored in the memory 840 when there does not exist a section in which the driving information violates traffic regulations.

Here, a section in which driving information violates traffic regulation may denote a section of allowing the vehicle to violate traffic regulations when driving the vehicle along driving information or a section associated with driving information generated from a section that violates traffic regulations when driving in a manual driving mode.

On the contrary, as illustrated in FIG. 11(*a*), the processor 870 may allow the vehicle to drive in a manual driving mode when the section in which driving information violates traffic regulation is entire sections 1030*a*, 1030*b*, 1030*c* between the first point 1010 and the second point 1020.

Specifically, the processor 870 may call or retrieve driving information (or learning data) that has been driven in a manual driving mode. Here, calling driving information may denote determining driving information used for autonomous driving.

The processor 870 may call (or determine) driving information based on a preset condition (for example, any one driving information being selected through the display unit 830, the vehicle being located at a first point included in any one of a plurality of driving information stored in the memory) being satisfied.

Then, the processor 870 may determine whether or not there exists an item in violation of traffic regulations on a route of the called driving information, based on information related to the traffic regulations.

Specifically, the processor 870 may determine whether a violation of the traffic regulations is included over the entire sections of a learning route (driving route) included in the driving information.

For example, when driving information including the first point 1010 and the second point 1020 is called, the processor 870 may determine whether or not there exists a violation of traffic regulations in the sections (Link 1, Link 2, Link 3) including the driving information based on information related to the traffic regulations.

Then, the processor 870 may control the vehicle based on the determination result. Specifically, when there exists a violation of regulations in the entire sections of the driving information, the processor 870 may display route information (route guidance information) that drives from the first point to the second point on the display unit 830.

Furthermore, when there exists a violation of regulations in the entire sections of the driving information, the processor 870 may allow the vehicle to drive in a manual driving mode.

At this time, as illustrated in FIG. 11B, the processor 870 may learn new driving information 1030' that has been driven in a manual driving mode from the first point 1010 to the second point 1020. In addition, when the vehicle has driven in accordance with the traffic regulations in the entire sections between the first point and the second point based on the learned driving information 1030' and information related to the traffic regulations, the new driving information 1030' may be stored in the memory 840.

The stored new driving information 1030' may be used for autonomous driving when the vehicle is later relocated at the first point 1010.

On the other hand, when a section in which driving information violates traffic regulations is a partial section between the first point and the second point, the processor 870 may control the vehicle in different ways based on whether or not it is possible to modify driving information for the partial section.

For example, as illustrated in FIG. 12(*a*), the processor 870 may determine whether or not there exists a violation of traffic regulations for the entire sections (e.g., Link 1, Link 2, Link 3) between the first point (starting point) 1010 and the second point (ending point) 1020 included in the called driving information (learning data).

At this time, when there is a violation of traffic regulations in a partial section (Link 2) between the first point and the second point, the processor 870 may determine whether or not to modify driving information 1030*b* included in the partial section.

At this time, when it is impossible to modify the driving information 1030*b* for the partial section (Link 2), the processor 870 may allow the vehicle to drive in a manual driving mode in the partial section (Link 2) among the sections (Link 1, Link 2, Link 3) between the first point 1010 and the second point 1020, and allow the vehicle to drive in an autonomous driving mode using driving information 1030*a*, 1030*c* in the remaining sections (Link 1, Link 3).

In other words, the processor 870 may allow the vehicle to perform autonomous driving using driving information (driving information stored in the memory) that has been driven in a manual driving mode for a section including the driving information in accordance with traffic regulations among sections between the first point 1010 and the second point 1020.

In addition, the processor 870 may control the vehicle in a manual driving mode to allow the vehicle to perform manual driving in a section including driving information in violation of traffic regulations among sections between the first point 1010 and the second point 1020.

At this time, the processor 870 may learn driving information that is driven in a manual driving mode in a section including the driving information in violation of the traffic regulations, and update (modify) the called driving information using the learned driving information when there exists no violation of traffic regulations for the learned driving information.

Figure 13:
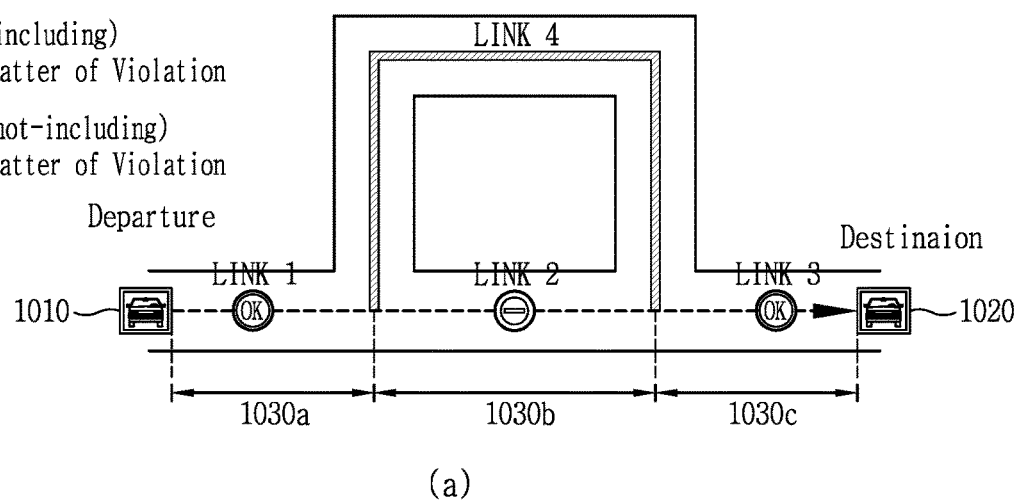
Figure 13:
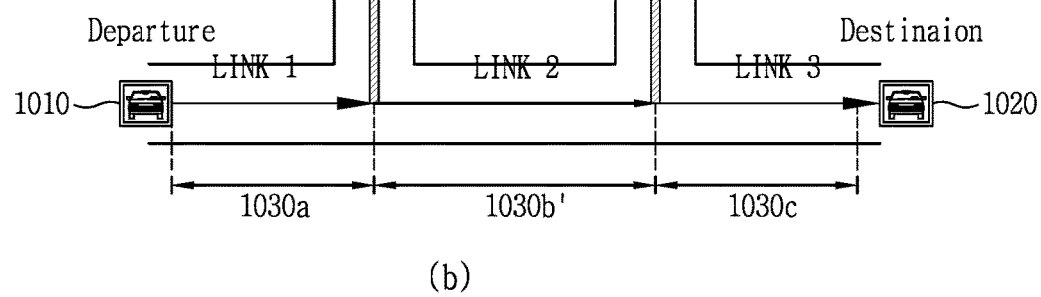

On the other hand, as illustrated in FIG. 13(*a*), when there exists the driving information 1030*b* including a violation of traffic regulations in the partial section (Link 2) among the entire sections included in the called driving information, and the modification of the driving information 1030*b* for the partial section is allowed, the processor 870 may modify the driving information 1030*b* for the partial section among the driving information (e.g., the called driving information) stored in the memory 840.

Furthermore, the processor 870 may allow the vehicle to drive in an autonomous driving mode from the first point 1010 to the second point 1020 based on the modified driving information 1030*b'*.

At this time, as illustrated in FIG. 13(*b*), the processor 870 may allow the vehicle to perform autonomous driving using driving information in accordance with traffic regulations for sections (Link 1, Link 3) other than the partial section, and allow the vehicle to perform autonomous driving using the modified driving information for the partial section (Link 2).

In addition, even when the driving information 1030*b* including a violation of traffic regulations included in the partial section is modified, the processor 870 may display screen information capable of selecting whether to allow the vehicle to perform autonomous driving or perform manual driving through the modified driving information 1030*b'* (or whether or not to learn driving information again through manual driving) on the display unit 830.

Then, the processor 870 may control the vehicle based on an item selected through the display unit 830.

Figure 14:
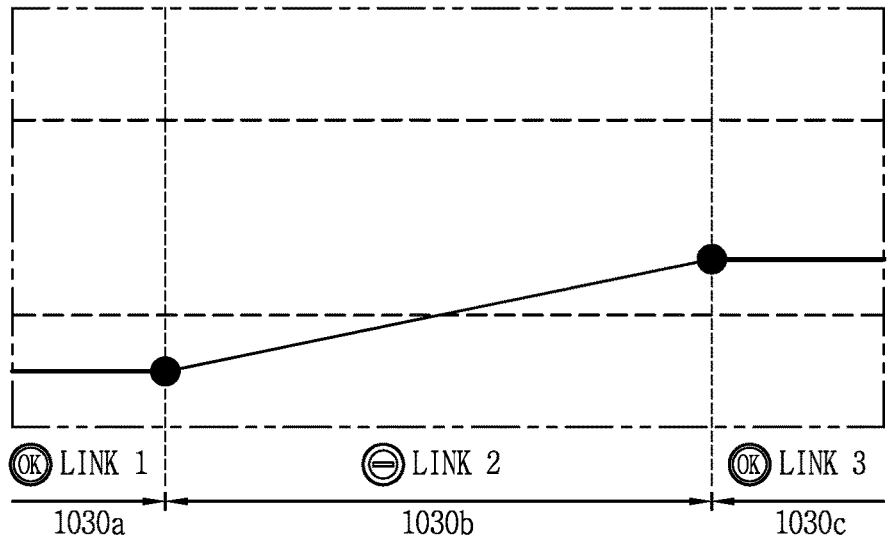
Figure 14:
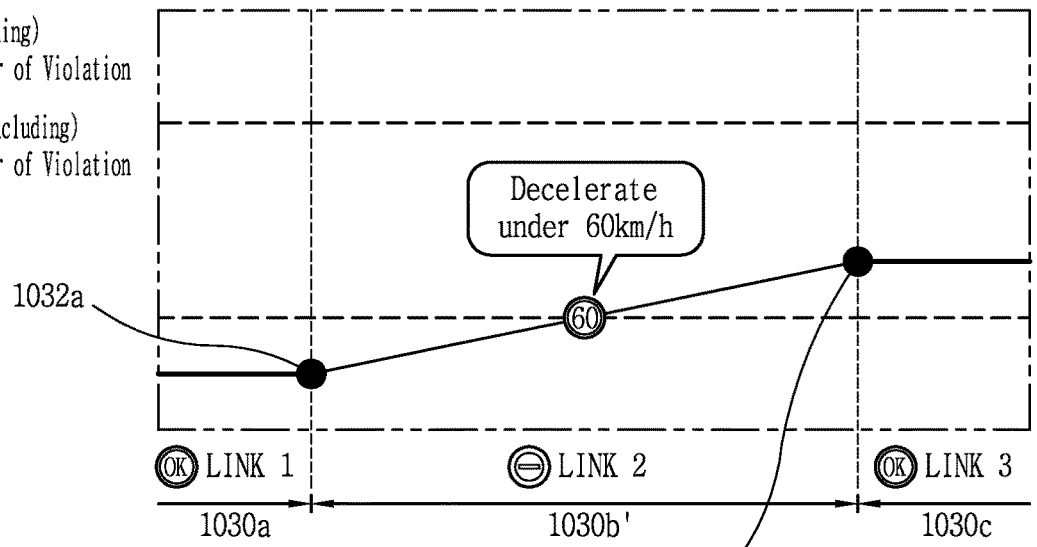

Referring to FIG. 14, a method for modifying driving information will be described.

Referring to FIG. 14(*a*), the processor 870 may determine driving information 1030*b* including a violation of traffic regulations among the called driving information.

In this situation, the processor 870 may determine a section (Link 2) included in the driving information 1030*b* including the violation of the traffic regulation.

The processor 870 may determine whether the driving information 1030*b* has violated traffic regulations in the section based on information related to the traffic regulations.

The processor 870 may modify driving information including a violation of traffic regulations using information for observing traffic regulations and driving information 1030*a*, 1030*c* included in the sections (Link 1, Link 3) that comply with the traffic regulations.

For example, as illustrated in FIG. 14(*b*), the processor 870 may connect driving routes 1032*a*, 1032*c* existing at both ends of the section (Link 1, Link 3) that comply with the traffic regulations to generate new driving information 1030*b'* to include a new driving route. Here, generating new driving information may be included in modifying the driving information 1030*b*.

In addition, the new driving route 1030*b'* may include information on a speed of the vehicle, whether or not the vehicle changes lane, and the like, to comply with traffic regulations in the section (Link 2).

Furthermore, when modifying the driving information 1030*b* of a partial section including a violation of the traffic regulation, the processor 870 may generate new driving information 1030*b'* in consideration of a driving speed of another vehicle as well as the traffic regulations.

Figure 15:
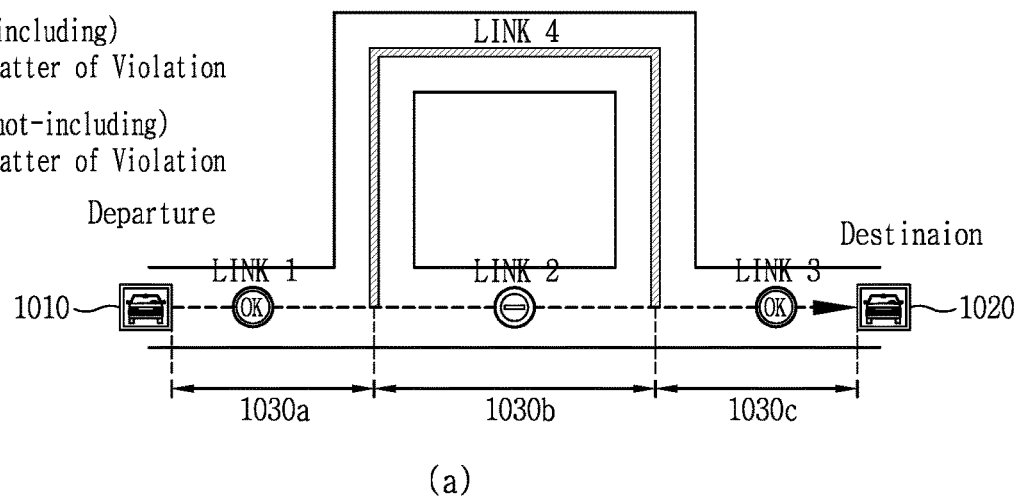
Figure 15:
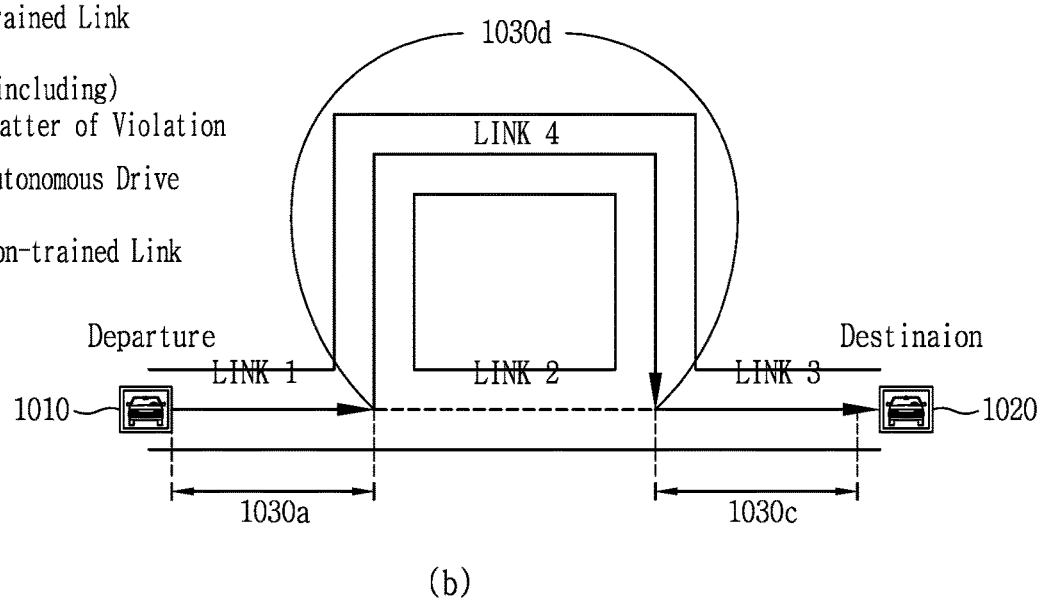

On the other hand, as illustrated in FIG. 15(*a*), there may be a situation where the driving information 1030*b* including the violation of the traffic regulations in the partial section (Link 2) among the called driving information is associated therewith, and driving by taking a detour to a new section Link 4) may be allowed.

In this situation, the processor 870 may generate driving information 1030*d* capable of performing autonomous driving in the new section (Link 4) as illustrated in FIG. 15(*b*), or receive the driving information 1030*d* that has driven in a manual driving mode in the new section (Link 4) from an external device through the communication unit 810.

The processor 870 may generate the driving information 1030*d* based on information related to traffic regulations and a driving history that has driven in the new section in the past. For example, the processor 870 may generate the driving information 1030*d* in the new section (Link 4) using a driving route according to the driving history and information related to traffic regulations in the new section.

Then, the processor 870 may allow the vehicle to perform autonomous driving using the new driving information 1030*d* and driving information 1030*a*, 1030*c* that comply with traffic regulations included in the called driving information, from the first point 1010 to the second point 1020.

On the other hand, there may be a situation where driving information is stored in a state where traffic regulations are observed in entire sections that have been driven in a manual driving mode at the time of being stored in the memory 840 but the traffic regulations have recently been changed or the state of a road has changed in a partial section.

In this situation, the processor 870 may allow the vehicle to drive in a manual driving mode in the partial section or modify driving information for the partial section.

Figure 16:
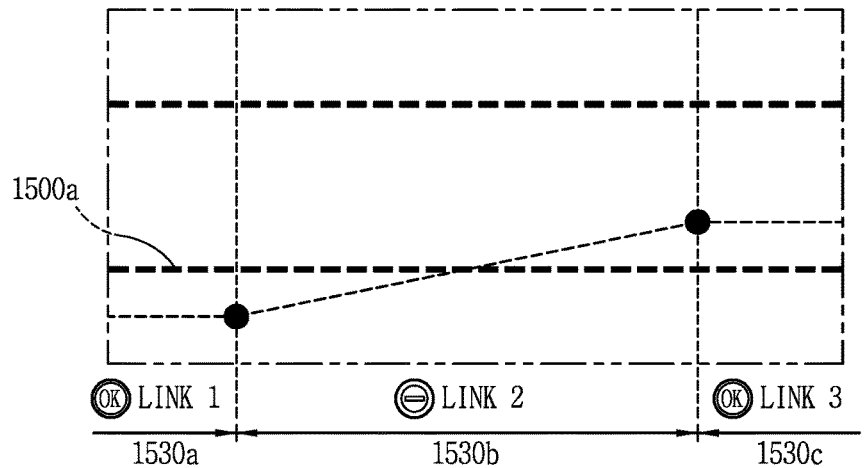
Figure 16:
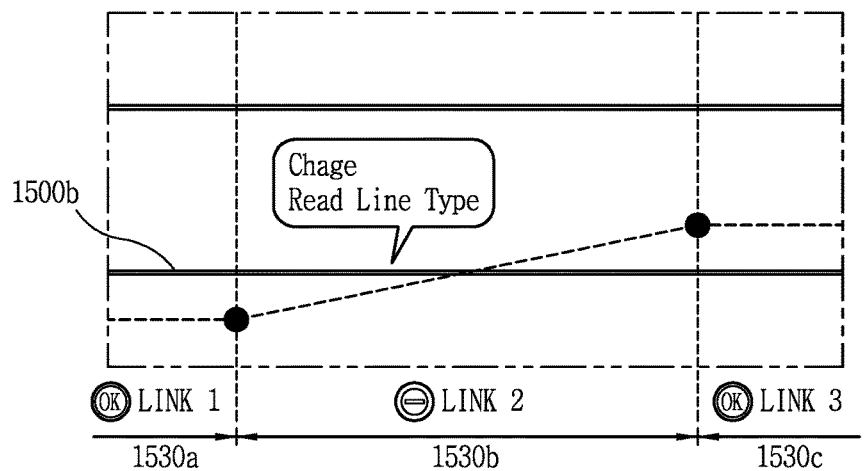
Figure 16:
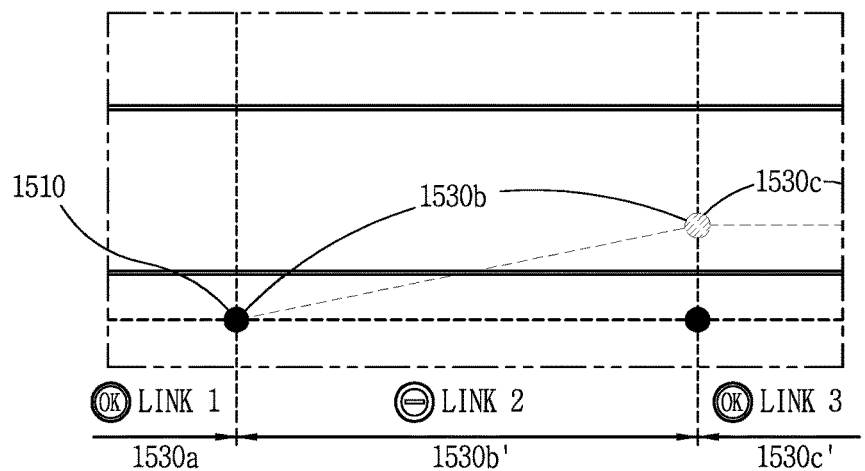

For example, as illustrated in FIG. 16(*a*)-(*c*), when driving information is learned in a manual driving mode, it was a situation in which traffic regulations are observed even when a lane change is made as the type of the lane is a dotted line 1500*a*.

However, as the lane is changed to a solid line 1500*b*, it may happen a situation where driving information 1530*b* that has been driven in the partial link (Link 2) violates the traffic regulations.

In this situation, the processor 870 may change driving information 1530*b*, 1530*c* included in a partial section (a section (Link 2) in which the driving information violates traffic regulations and/or a section (Link 3) in which the driving information is changed by the section (Link 2) or allow the vehicle to drive in a manual driving mode in the partial sections (Link 2, Link 3).

The processor 870 may generate new driving information 1530*b*' and 1530*c*' to comply with traffic regulations using information related to the traffic regulations changed in the partial sections (Link 2, Link 3).

In addition, when the vehicle is driven in a manual driving mode in the partial sections (Link 2, Link 3), the processor 870 may reflect driving information 1530*b*', 1530*c*' that have been driven in a manual driving mode in the partial sections on driving information (e.g., called driving information) stored in the memory 840.

Through the foregoing configuration, the present disclosure may provide a new user interface capable of generating legitimate driving information when the driving information is learned, but changes or modifies driving information according to changed traffic regulations or road conditions when the traffic regulations are changed or when the road conditions change (for example, the type of lane is changed or the speed limit is changed, etc.) thereafter.

Figure 17:
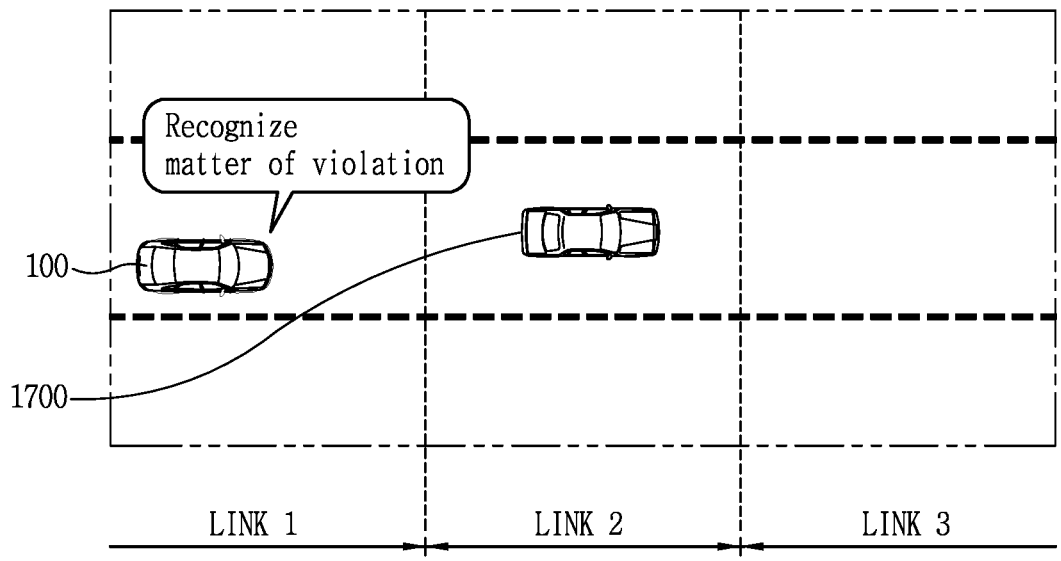
Figure 17:
Figure 17:
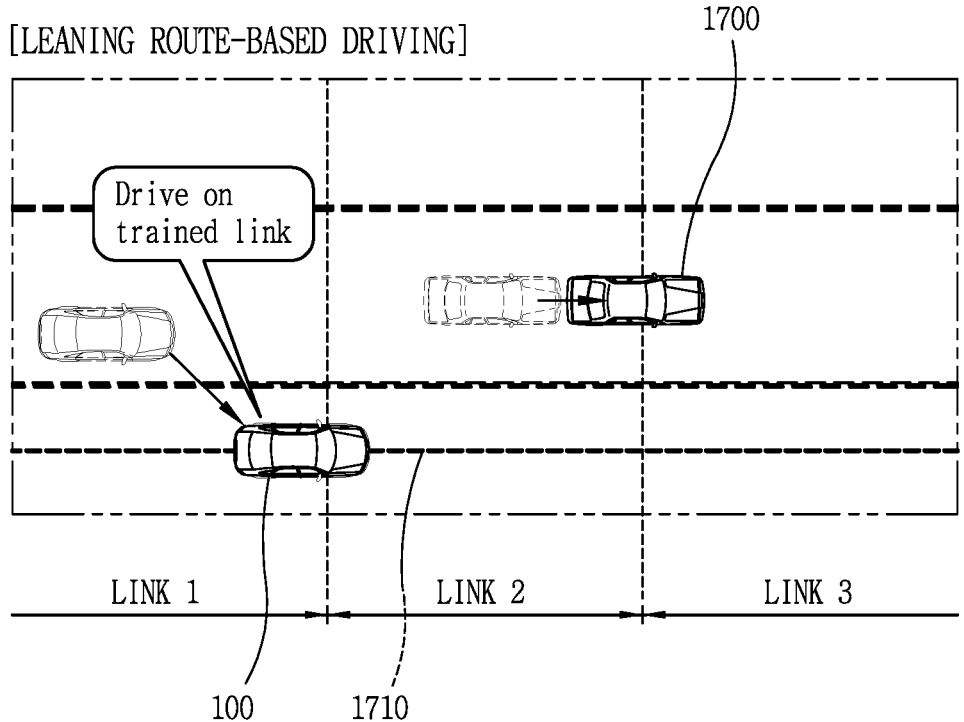

On the other hand, referring to FIG. 17, the processor 870 may perform platooning (e.g., the linking of two or more vehicles in a convoy) for performing autonomous driving following another vehicle 1700 (or a preceding vehicle) different from the vehicle 100. For example, the another vehicle is generally located in front of the vehicle 100, but is not limited thereto.

The processor 870 may perform platooning for allowing the vehicle to perform autonomous driving following another vehicle based on the driving information of the another vehicle 1700 received through the communication unit 810 or information related to the another vehicle sensed through the sensing unit 820.

Here, the processor 870 may determine whether or not the another vehicle 1700 is driving while complying with traffic regulations, based on information related to the traffic regulations.

Here, as illustrated in FIG. 17(*a*)-(*b*), when it is determined that the another vehicle 1700 is driving while violating traffic regulations, the processor 870 may determine whether or not there exists driving information (e.g., driving information previously learned by the vehicle or the another vehicle) that has previously been driven in a manual driving mode on the road currently being driven on.

In addition, the processor 870 may determine whether or not the driving information that has been driven in a manual driving mode complies with traffic regulations using information related to the traffic regulations.

Then, when the driving information 1710 complies with the traffic regulations, the processor 870 may not perform platooning following the another vehicle 1700, and may allow the vehicle to perform autonomous driving based on the driving information 1710.

Here, the processor 870 may allow the vehicle to perform autonomous driving based on the driving information 1710 until the another vehicle 1700 drives while complying with the traffic regulations.

When the another vehicle 1700 drives while complying with the traffic regulations, the processor 870 may perform platooning for performing autonomous driving following the another vehicle 1700.

On the other hand, when the another vehicle 1700 drives while complying with the traffic regulations, the processor 870 may display screen information for asking whether to perform platooning following the another vehicle 1700 or allowing the vehicle to drive according to the driving information 1710 that has been driven in a manual driving mode on the display unit 830, and control the vehicle according to the user's selection.

The above information may be also applicable even when parking the vehicle.

For example, when the driving information that has been driven in a manual driving mode includes a driving route for parking the vehicle, the processor 870 may determine traffic regulations at the ending point included in the driving information based on information related to the traffic regulations For example, the ending point may be a disabled parking area, a fire truck parking area, or a rear parking disabled area.

At this time, the processor 870 may display information for guiding the learning of new driving information through new manual driving on the display unit 830 in situation where a disabled parking area is the ending point though the vehicle is a vehicle that is not registered for a disabled person, in a situation where the ending point is a fire truck parking area, or in a situation where it is driving information in which front parking is carried out using the driving information that has been driven in a manual driving mode.

Then, when the new driving information is learned through the new manual driving, the processor 870 may determine whether or not the learned driving information satisfies traffic regulations, and may store, not store or modify the learned driving information in the memory 840 according to the determination result.

According to an embodiment of the present disclosure, there is one or more of the following effects.

First, the present disclosure may provide a new autonomous driving method capable of allowing a vehicle to perform autonomous driving based on information related to driving learned through manual driving.

Second, the present disclosure may provide a vehicle control device and a control method of the vehicle capable of allowing a vehicle to perform autonomous driving through at least one of a learning autonomous driving mode learned through previous manual driving and a sensor autonomous driving mode using a sensing unit.

Third, the present disclosure may provide a new control method of a vehicle allowing the vehicle to perform autonomous driving in a learning autonomous driving mode for a section in which the vehicle is unable to drive in a sensor autonomous travel mode.

Fourth, the present disclosure may provide a vehicle control device capable of processing driving information in an optimized manner when the vehicle is manually driven in violation of traffic regulations when learning driving information through manual driving.

Fifth, the present disclosure provides a control method capable of modifying driving information to comply with traffic regulations when the driving information violates the traffic regulations or when road situation or the traffic regulations are changed to violate the driving information, thereby allowing a vehicle to more safely perform autonomous driving.

The effects of the present disclosure may not be limited to the above-mentioned effects, and other effects not mentioned herein may be clearly understood by those skilled in the art from the description of the claims.

The vehicle control device 800 described above may be included in the vehicle 100.

Furthermore, the operation or control method of the vehicle control device 800 described above will be analogically applied to the operation or control method of the vehicle 100 (or controller 170) in the same or similar manner.

For example, the control method of the vehicle 100 (or the control method of the vehicle control device 800) may include storing driving information in which the vehicle has driven in a manual driving mode in the memory, and allowing the vehicle to drive in an autonomous mode based on the stored driving information, in which the storing step stores driving information in which the vehicle has driven in a manual driving mode in a preset manner based on information related to traffic regulations.

A more specific embodiment will be substituted by the earlier description, or will be analogically applied thereto in the same or similar manner.

Each of the above steps may be carried out not only by the vehicle control device 800 but also by the controller 170 provided in the vehicle 100.

Furthermore, all functions, configurations, or control methods carried out by the foregoing vehicle control device 800 may be carried out by the controller 170 provided in the vehicle 100. In other words, all the control methods described in this specification may be applied to a control method of a vehicle or a control method of a control device.

In addition, the foregoing vehicle control device 800 may be a mobile terminal. In this situation, all functions, configurations, or control methods carried out by the vehicle control device 800 may be carried out by the controller of the mobile terminal. In addition, all the control methods described in this specification will be analogically applied to a control method of a mobile terminal in the same or similar manner.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control device, comprising:
a memory; and
a processor configured to:
generate driving information including information of driving a vehicle in a manual driving mode from a first point to a second point in a preset manner based on traffic regulations stored in the memory,
store the driving information in the memory, and
drive the vehicle in an autonomous driving mode based on the driving information stored in the memory,
wherein the processor is further configured to:
determine a section of a driving route in which the vehicle violates the traffic regulations between the first point and the second point, and
generate the driving information in a different manner than the preset manner based on the section of the driving route in which the vehicle violates the traffic regulations.

2. The vehicle control device of claim 1, wherein the processor is further configured to:
not store the driving information corresponding to the section of the driving route in which the vehicle violates the traffic regulations between the first point and the second point, and
output a notification requesting a new manual driving attempt for regenerating the driving information corresponding to the section of the driving route in which the vehicle violates the traffic regulations between the first point and the second point through the output unit.

3. The vehicle control device of claim 1, wherein the processor is further configured to:
not store driving information corresponding to the section of the driving route in which the vehicle violates the traffic regulations between the first point and the second point, and
store previous driving information corresponding to when the vehicle was previously driven in the manual driving mode while complying with the traffic regulations for the section.

4. The vehicle control device of claim 1, wherein the processor is further configured to:
modify driving information corresponding to the section of the driving route in which the vehicle violates the traffic regulations in a preset manner to generate modified driving information, and
store the modified driving information in the memory.

5. The vehicle control device of claim 4, wherein the modified driving information includes information received from another vehicle that has previously driven the section of the driving route in which the vehicle violates the traffic regulations or driving history information from when the vehicle has previously driven the section of the driving route while complying with the traffic regulations.

6. The vehicle control device of claim 1, wherein the processor is further configured to:
store the driving information corresponding to the section of the driving route in which the vehicle violates the traffic regulations between the first point and the second point.

7. The vehicle control device of claim 1, wherein the processor is further configured to:
process the driving information differently based on a state of a section of the driving route or road conditions of a second of the driving route.

8. The vehicle control device of claim 1, wherein the processor is further configured to store driving information corresponding to a section of a driving route between the first point and the second point in which the vehicle complies with the traffic regulations.

9. The vehicle control device of claim 1, wherein the driving information stored in the memory includes information corresponding to when the vehicle has previously driven from the first point to the second point in the manual driving mode, or information from another vehicle that has previously driven from the first point to the second point in the manual driving mode, and wherein the processor detects whether or not the driving information includes a section of a driving route between the first point and the second point that violates the traffic regulations before driving the vehicle in the autonomous driving mode.

10. The vehicle control device of claim 9, wherein the processor drives the vehicle in the autonomous driving mode from the first point to the second point using the driving information stored in the memory when all sections in the driving information for a driving route between the first point and the second point comply with the traffic regulations.

11. The vehicle control device of claim 9, wherein when a section in which the driving information violates the traffic regulations between the first point and the second point, the processor places the vehicle in the manual driving mode.

12. The vehicle control device of claim 9, wherein when a section of a driving route between the first point and the second point in the driving information violates the traffic regulations, the processor controls the vehicle in different ways based on whether the processor modifies the driving information for the section to comply with the traffic regulations.

13. The vehicle control device of claim 12, wherein the processor does not modify the driving information for the section to comply with the traffic regulations and places the vehicle in the manual driving mode while driving in the section, and drives the vehicle in the autonomous driving mode while in other sections of the driving route between the first point and the second for which the driving information does comply with the traffic regulations.

14. The vehicle control device of claim 12, wherein the processor generates modified driving information for the section that complies with the traffic regulations and drives the vehicle in the autonomous driving mode while driving in the section based on the modified driving information.

15. The vehicle control device of claim 1, wherein when the driving information is stored in a state where the traffic regulations are complied with for an entirety of a driving route between the first point and the second point while the vehicle is driven in the manual driving mode at a time of being stored in the memory and the traffic regulations change or a state of a road changes for a section of the driving route between the first point and the second point, the processor places the vehicle in the manual driving mode in the section or modifies driving information for the section and drives the vehicle in the autonomous driving mode.

16. The vehicle control device of claim 15, wherein when the vehicle is driven in the manual driving mode in the section, the processor stores new driving information corresponding to the section in the memory.

17. A vehicle including the vehicle control device of claim 1.

18. A method of controlling a vehicle, the method comprising:
generating driving information including information of driving the vehicle in a manual driving mode from a first point to a second point in a preset manner based on traffic regulations stored in a memory;
storing the driving information in the memory;
driving the vehicle in an autonomous driving mode based on the driving information stored in the memory;
determining a section of a driving route in which the vehicle violates the traffic regulations between the first point and the second point; and
generating the driving information in a different manner than the preset manner based on the section of the driving route in which the vehicle violates the traffic regulations.

19. A vehicle control device, comprising:
a memory; and
a processor configured to:
generate driving information including information of driving a vehicle in a manual driving mode from a first point to a second point in a preset manner based on traffic regulations stored in the memory,
store the driving information in the memory, and
drive the vehicle in an autonomous driving mode based on the driving information stored in the memory,
wherein the driving information stored in the memory includes information corresponding to when the vehicle has previously driven from the first point to the second point in the manual driving mode, or information from another vehicle that has previously driven from the first point to the second point in the manual driving mode, and
wherein the processor detects whether or not the driving information includes a section of a driving route between the first point and the second point that violates the traffic regulations before driving the vehicle in the autonomous driving mode.

* * * * *